United States Patent
Kino et al.

(10) Patent No.: US 9,120,457 B2
(45) Date of Patent: Sep. 1, 2015

(54) SIDE AIRBAG APPARATUS

(71) Applicant: TOYODA GOSEI CO., LTD., Kiyosu-shi, Aichi-ken (JP)

(72) Inventors: Masao Kino, Kiyosu (JP); Eiji Sato, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/566,759

(22) Filed: Dec. 11, 2014

(65) Prior Publication Data

US 2015/0183393 A1 Jul. 2, 2015

(30) Foreign Application Priority Data

Dec. 26, 2013 (JP) .................................. 2013-270339
Aug. 26, 2014 (JP) .................................. 2014-171600

(51) Int. Cl.
*B60R 21/237* (2006.01)
*B60R 21/231* (2011.01)
*B60R 21/233* (2006.01)
*B60R 21/207* (2006.01)
*B60R 21/276* (2006.01)

(52) U.S. Cl.
CPC ......... *B60R 21/23138* (2013.01); *B60R 21/207* (2013.01); *B60R 21/233* (2013.01); *B60R 21/237* (2013.01); *B60R 21/276* (2013.01); *B60R 2021/23146* (2013.01)

(58) Field of Classification Search
CPC ............ B60R 21/23138; B60R 21/207; B60R 21/233; B60R 21/237; B60R 2021/23146
See application file for complete search history.

(56) References Cited

U.S. PATENT DOCUMENTS

| | | | |
|---|---|---|---|
| 5,868,420 A | 2/1999 | Higashiura et al. | |
| 6,110,194 A | 8/2000 | Saber | |
| 6,224,092 B1 | 5/2001 | Sakamoto et al. | |
| 6,231,070 B1 | 5/2001 | Sunabashiri et al. | |
| 8,757,657 B1 * | 6/2014 | Hotta et al. | 280/730.2 |
| 2006/0202450 A1 | 9/2006 | Madasamy et al. | |
| 2008/0079249 A1 | 4/2008 | Yamamura | |
| 2011/0285119 A1 * | 11/2011 | Yamamoto et al. | 280/743.2 |
| 2012/0049494 A1 * | 3/2012 | Yamamoto | 280/730.2 |
| 2015/0021884 A1 * | 1/2015 | Hiraiwa et al. | 280/728.2 |
| 2015/0021887 A1 * | 1/2015 | Hiraiwa et al. | 280/729 |
| 2015/0076803 A1 * | 3/2015 | Fujiwara | 280/730.2 |

FOREIGN PATENT DOCUMENTS

| | | |
|---|---|---|
| JP | H09-150705 A | 6/1997 |
| JP | H11-152004 A | 6/1999 |
| JP | 2000-016222 A | 1/2000 |

(Continued)

*Primary Examiner* — Faye M Fleming
(74) *Attorney, Agent, or Firm* — Posz Law Group, PLC

(57) ABSTRACT

The present invention is applied to an airbag that is divided into a first inflation chamber and a second inflation chamber by a vertical partition having a communication hole. The airbag is folded to be turned into a storage form and stored in a storage portion located in the vicinity of a side of an occupant. The airbag is turned into the storage form by being subjected to first to third folding operations. In the first folding, an upper portion of the airbag in an uninflated and deployed state is folded back away from the occupant along a folding line that is inclined to be lower toward the front end. In the second folding, the airbag is folded from the front to the rear. In the third folding, an upper portion of the airbag is folded back away from the occupant.

5 Claims, 11 Drawing Sheets

(56) References Cited

FOREIGN PATENT DOCUMENTS

| JP | 2000-198404 A | 7/2000 |
| JP | 2000-514752 A | 11/2000 |
| JP | 2008-087632 A | 4/2008 |
| JP | 2010-070178 A | 4/2010 |

* cited by examiner

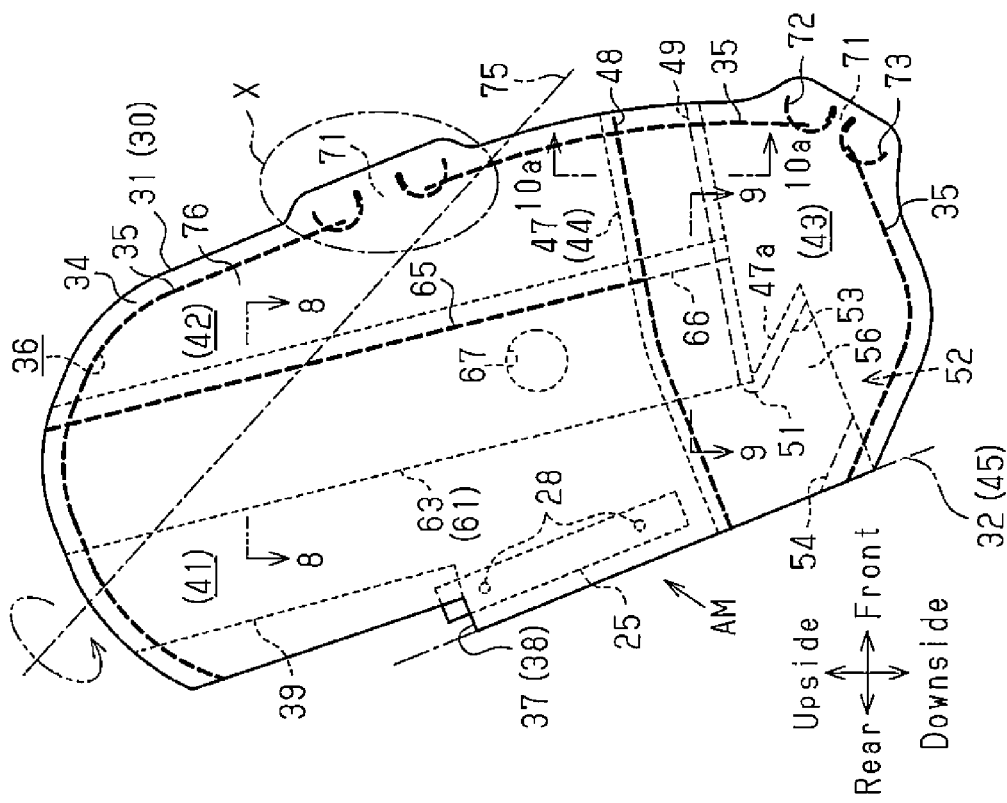
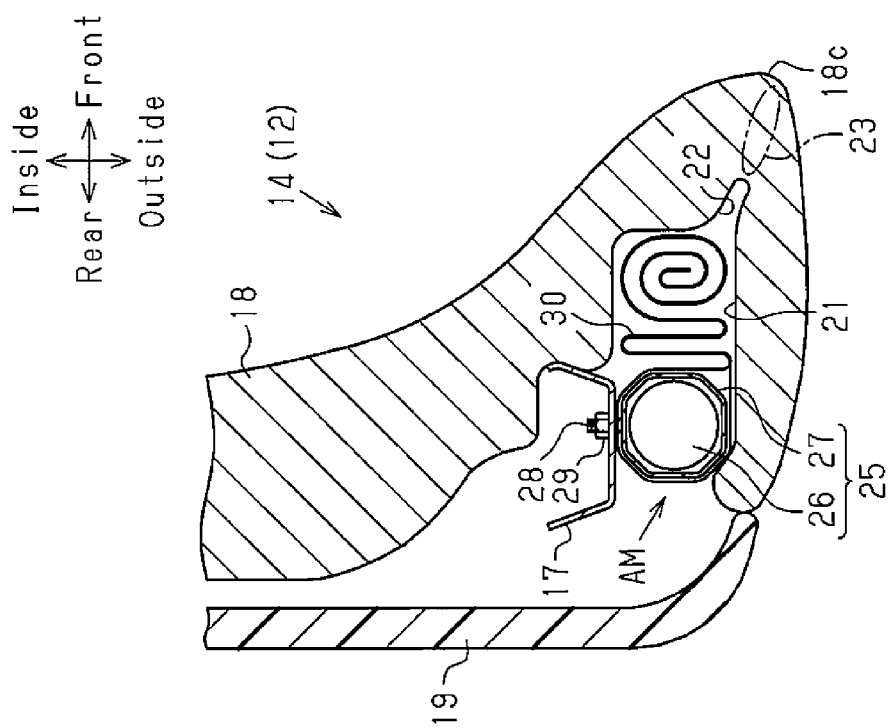

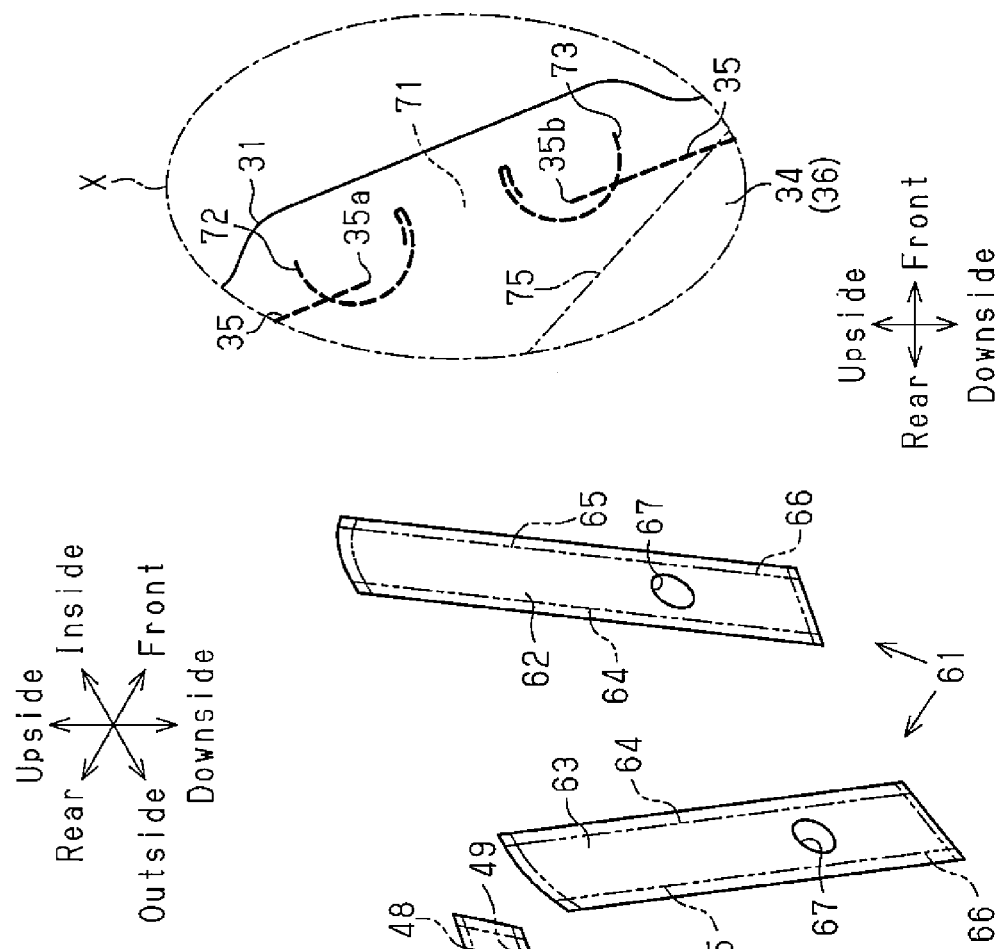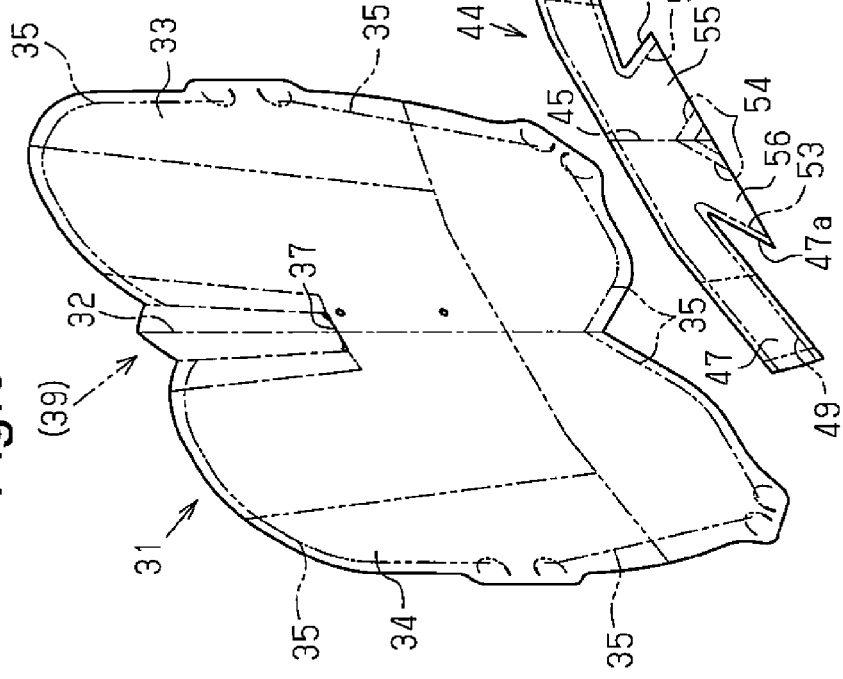

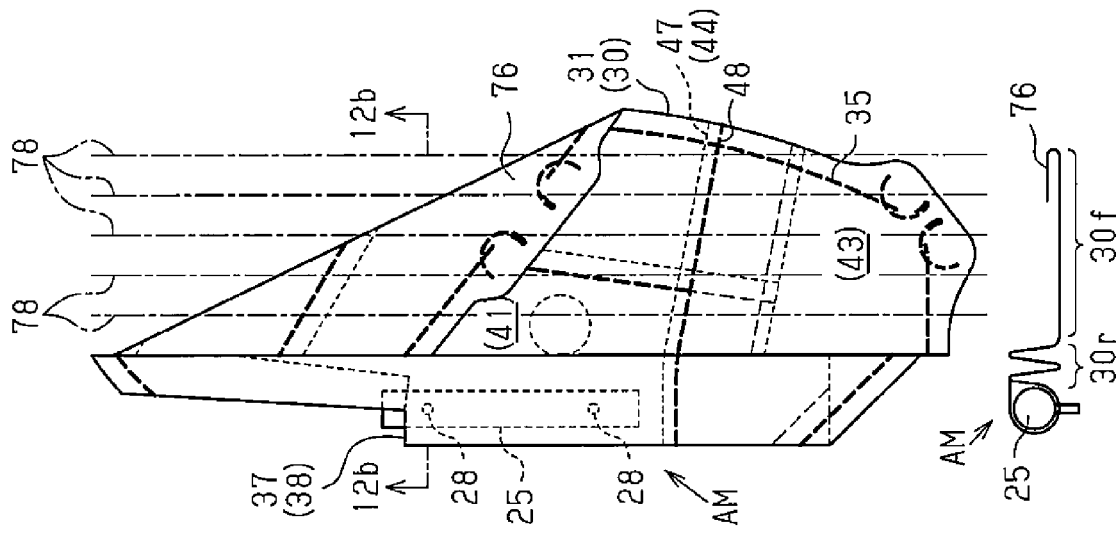
Fig.11A
Fig.11B
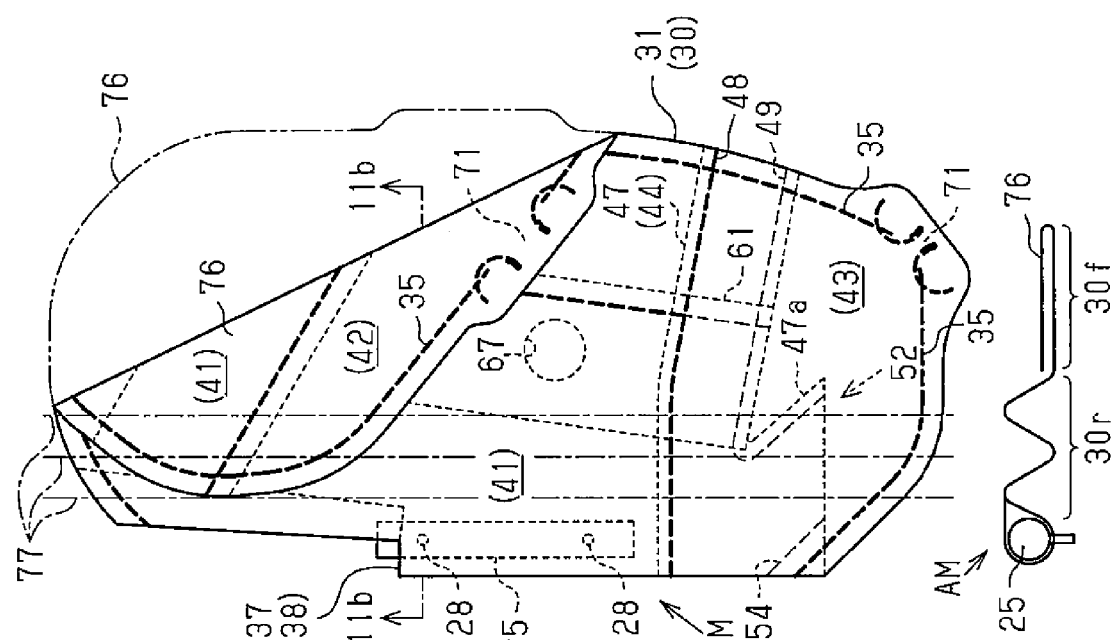
Fig.12A
Fig.12B

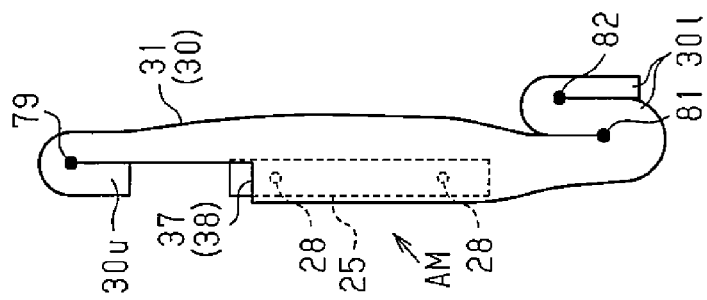
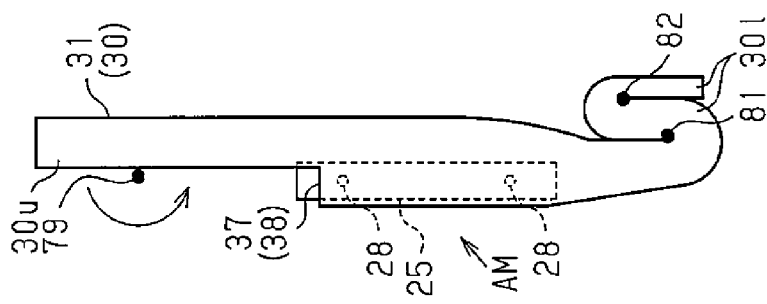
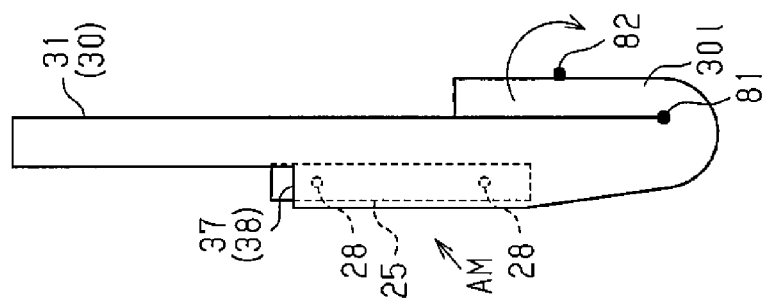
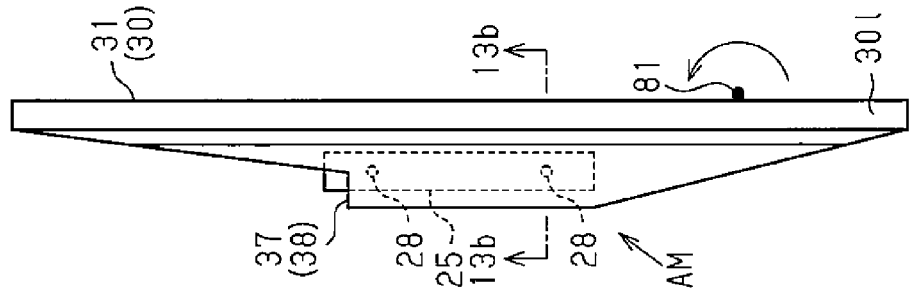
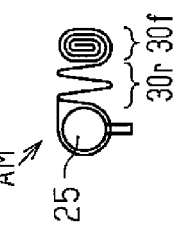

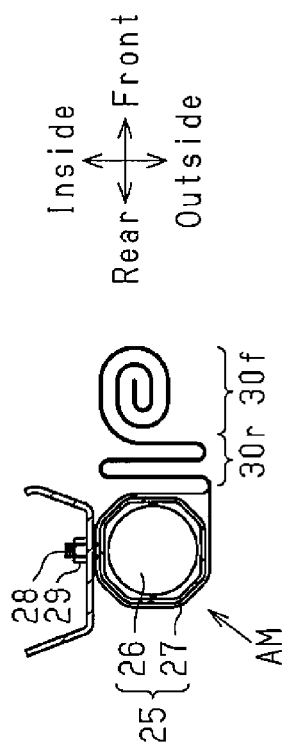
Fig.22A
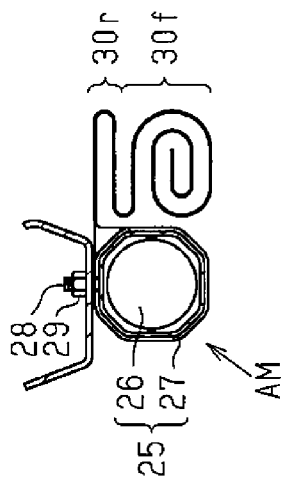
Fig.22B
Fig.22C
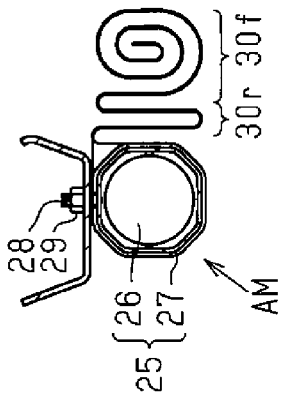
Fig.21
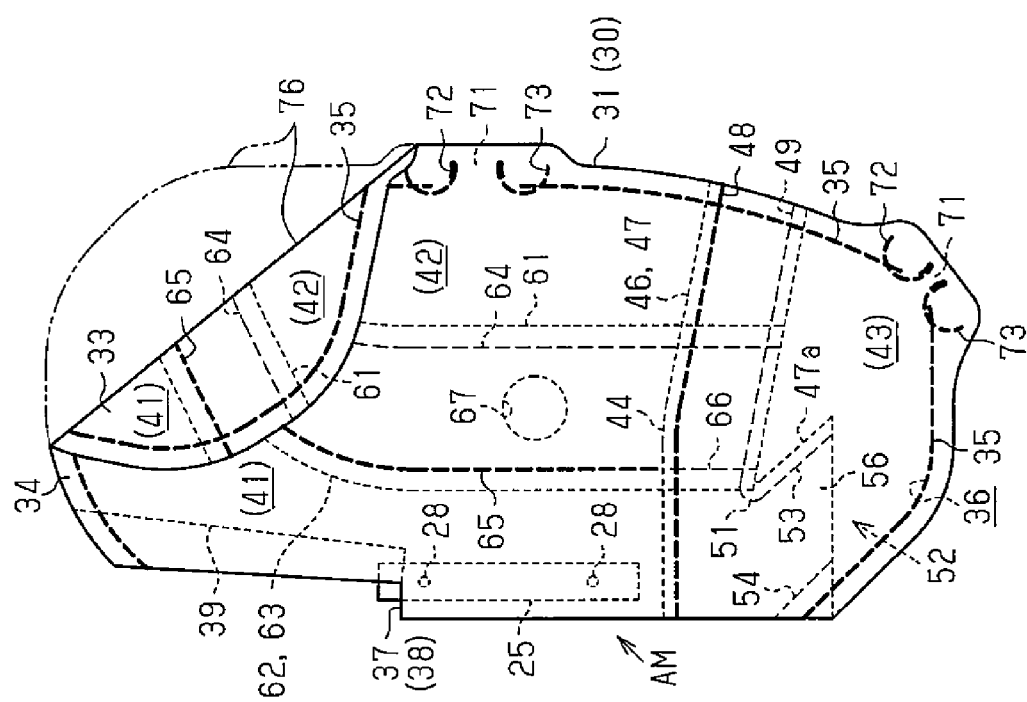

SIDE AIRBAG APPARATUS

BACKGROUND OF THE INVENTION

The present invention relates to a side airbag apparatus that protects an occupant seated in a vehicle seat from an impact by deploying and inflating an airbag on a side of the occupant when the impact is applied to a vehicle.

A side airbag apparatus is widely known for protecting an occupant from an impact when the impact is applied to an automobile from a side to an automobile seat in which the occupant is seated, for example, due to a side collision. In the side airbag apparatus, an airbag is installed in a seat back of an automobile seat in a folded state together with an inflator.

In the side airbag apparatus, when an impact is applied from the side on a member forming the side portion of an automobile (body side portion) such as a side door, inflation gas is supplied from the inflator into the airbag so that the airbag is deployed and inflated. The airbag is projected from the automobile seat with a part of the airbag remaining in the seat back. The airbag continues being deployed and inflated forward in the narrow space between the occupant and the body side portion. The airbag restrains the occupant and reduces the impact that is transmitted from the side to the occupant through the body side portion.

One form of such a side airbag apparatus is disclosed in US Patent Application Publication No. 2006/0202450. The side airbag apparatus of the publication includes an airbag, which is divided into an upstream-side inflation chamber and a downstream-side inflation chamber by a vertical partition having a communication hole. The upstream-side inflation chamber receives inflation gas from an inflator, and the downstream-side inflation chamber, which is adjacent to the front side of the upstream-side inflation chamber, receives the inflation gas via the communication hole.

In this side airbag apparatus, when the inflator discharges inflation gas in response to an impact, the inflation gas is first supplied to the upstream-side inflation chamber so that the upstream-side inflation chamber starts being deployed and inflated. The upstream-side inflation chamber restrains the rear half of the upper body of the occupant and protects it from the impact. Before the deployment and inflation of the upstream-side inflation chamber are completed, some of the inflation gas in the upstream-side inflation chamber flows to the downstream-side inflation chamber through the communication hole. The inflation gas starts deploying and inflating the downstream-side inflation chamber with a delay from the upstream-side inflation chamber to restrain the front half of the occupant's upper body, thereby protecting it from the impact.

The side airbag apparatus of the above publication deploys and inflates the downstream-side inflation chamber with a delay from the upstream-side inflation chamber. Thus, the airbag is prevented from being deployed as a whole with momentum. If an obstacle exists in front of the airbag, the obstacle will not be thrust by the airbag.

However, the communication hole connecting the upstream-side inflation chamber and the downstream-side inflation chamber with each other is always open. Therefore, the inflation gas in the upstream-side inflation chamber flows into the downstream-side inflation chamber via the communication hole at a relatively early stage of the deployment and inflation of the upstream-side inflation chamber. Thus, the effect of preventing an obstacle from being thrust is less than satisfactory. Hence, the configuration is not applicable to a case in which a greater effect is sought.

Such a drawback is not limited to a case in which the side airbag apparatus is installed in an automobile, but applies to cases in which the apparatus is installed in any type of vehicle.

SUMMARY OF THE INVENTION

Accordingly, it is an objective of the present invention to provide a side airbag apparatus that effectively prevents an obstacle in front of the airbag from being thrust when the airbag is deployed.

To achieve the foregoing objective and in accordance with one aspect of the present invention, a side airbag apparatus that includes an inflator and an airbag is provided. The inflator discharges inflation gas in response to an impact applied to a vehicle seat from a side. The airbag includes a vertical partition having a communication hole, an upstream-side inflation chamber that is supplied with the inflation gas from the inflator, and a downstream-side inflation chamber located adjacent to and in front of the upstream-side inflation chamber. The airbag is divided into at least the upstream-side inflation chamber and the downstream-side inflation chamber by the vertical partition. The inflation chamber is supplied to the downstream-side inflation chamber via the communication hole. The airbag is folded to be turned into a storage form. The airbag in the storage form is configured to be stored in a storage portion located in the vicinity of a side of an occupant seated in a vehicle seat. The airbag in the storage form is configured to be deployed and inflated forward beside the occupant by the inflation gas. The airbag in the storage form is formed by first folding, second folding performed after the first folding, and third folding. In the first folding, at least one of an upper portion and a lower portion of the airbag in the uninflated and deployed state is folded back away from the occupant along a folding line that is inclined with respect to the front-rear direction. In the second folding, the airbag is folded from the front toward the rear. In the third folding, after the airbag has been turned into a transitional form in the second folding, one of the upper portion and the lower portion of the airbag that has been subjected to the first folding is folded back away from the occupant.

With the above described configuration, when the inflator discharges inflation gas, the inflation gas is supplied to the upstream-side inflation chamber of the airbag in the storage form to start inflating the upstream-side inflation chamber. As the inflation of the upstream-side inflation chamber progresses, the inflation gas in the upstream-side inflation chamber flows into the downstream-side inflation chamber through the communication hole formed in the vertical partition, so that the downstream-side inflation chamber starts being inflated with a delay from the upstream-side inflation chamber. The upstream-side inflation chamber and the downstream-side inflation chamber are inflated forward in the space between the vehicle seat and the vehicle structure member located on the side of the vehicle seat, while being unfolded in the reverse order of the order in which they were folded. Then, the upstream-side inflation chamber and the downstream-side inflation chamber restrain the occupant and reduce the impact that is transmitted from the side to the occupant through the vehicle structure member.

Since the downstream-side inflation chamber starts inflating with a delay from the upstream-side inflation chamber, the momentum of the airbag deployment is smaller than in a case in which the downstream-side inflation chamber is inflated substantially simultaneously with the upstream-side inflation chamber. This prevents an obstacle in front of the airbag from being thrust by the airbag being deployed.

Since the third folding and the first folding are carried out by folding back the airbag away from the occupant, the unfolding is carried out while being directed away from the occupant. When such unfolding is carried out with an obstacle in front of the vehicle seat, the direction of unfolding is directed away from the obstacle. Therefore, the obstacle in front of the airbag is further effectively prevented from being thrust at the unfolding of the third folding and the first folding.

At the unfolding of the second folding, the part that was folded back in the first folding acts as resistance, which restricts forward deployment and inflation of the airbag from the rear. Such restriction reduces the forward deployment and inflation from the rear compared to a case in which the second folding is performed without the first folding. Therefore, the obstacle in front of the airbag is further effectively prevented from being thrust at the unfolding of the second folding.

BRIEF DESCRIPTION OF THE DRAWINGS

FIG. 3 is a partially cross-sectional plan view showing the internal structure of a side portion of the seat back in which the airbag module of the embodiment of FIG. 1 is installed;

FIG. 4 is a side view of the airbag module, illustrating a state in which the airbag is in an uninflated and deployed state in the embodiment of FIG. 1;

FIG. 6 is an exploded perspective view showing a spread state of the components of the airbag in the embodiment of FIG. 1;

FIG. 7 is a partial side view of region X of FIG. 4;

FIG. 11A is a side view of the airbag module, illustrating a state in which first folding has been performed on the airbag of FIG. 4, which is in an uninflated and deployed state;

FIG. 11B is a cross-sectional view taken along line 11B-11B of FIG. 11A;

FIG. 12A is a side view of the airbag module, illustrating a state in which second folding is being performed on the airbag of FIG. 11A;

FIG. 12B is a cross-sectional view taken along line 12B-12B of FIG. 12A;

FIG. 13A is a side of the airbag module, illustrating a state in which the second folding performed on the airbag of FIG. 12A has turned the airbag into a transitional form;

FIG. 13B is a cross-sectional view taken along line 13B-13B of FIG. 13A;

FIG. 14 is a side view of the airbag module, illustrating a state in which the airbag lower portion of FIG. 13A is being folded back;

FIG. 15 is a side view of the airbag module, illustrating a state in which the airbag lower portion of FIG. 14 has been folded back;

FIG. 16 is a side view of the airbag module, illustrating a state in which the airbag upper portion $30u$ of FIG. 15 has been folded back so that the airbag module has been turned into a storage form;

FIG. 21 is a side view of the airbag module, illustrating a state in which the first folding has been performed on the airbag of FIG. 20, which is in an uninflated and deployed state;

FIG. 22A is a cross-sectional plan view of an airbag and surrounding components, illustrating a state in which second folding has been performed on the airbag in a manner according to a first variation different from the first and second embodiment;

FIG. 22B is a cross-sectional plan view of an airbag and surrounding components, illustrating a state in which second folding has been performed on the airbag in a manner according to a second variation different from FIG. 22A;

FIG. 22C is a cross-sectional plan view of an airbag and surrounding components, illustrating a state in which second folding has been performed on the airbag in a manner according to a third variation different from FIGS. 22A and 22B;

DETAILED DESCRIPTION OF THE PREFERRED EMBODIMENTS

First Embodiment

An automobile side airbag apparatus according to a first embodiment of the present invention will now be described with reference to FIGS. 1 to 19.

In the following, the direction in which an automobile advances forward will be referred to as the front, and reverse direction will be referred to as the rear. The middle of the widthwise direction of the automobile is used as reference in the widthwise direction of the automobile. A side closer to the middle of the widthwise direction will be referred to as "inner side" of the automobile, while a side farther from the middle of the widthwise direction will be referred to "outer side" of the automobile.

It is provided that an average sized adult is seated as an occupant in an automobile seat in an adequate posture.

Figure 1:
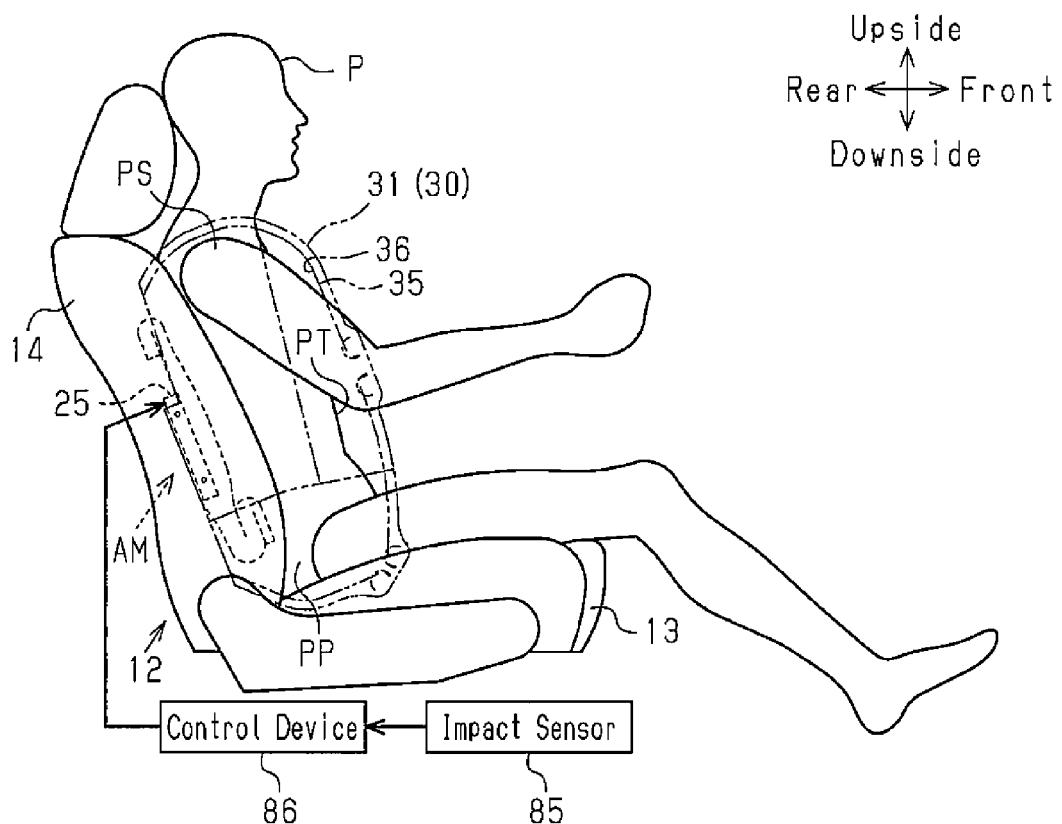
FIG. 1 is a side view of an automobile side airbag apparatus according to a first embodiment, illustrating, together with an airbag and an occupant, the apparatus installed in an automobile seat.
Figure 2:
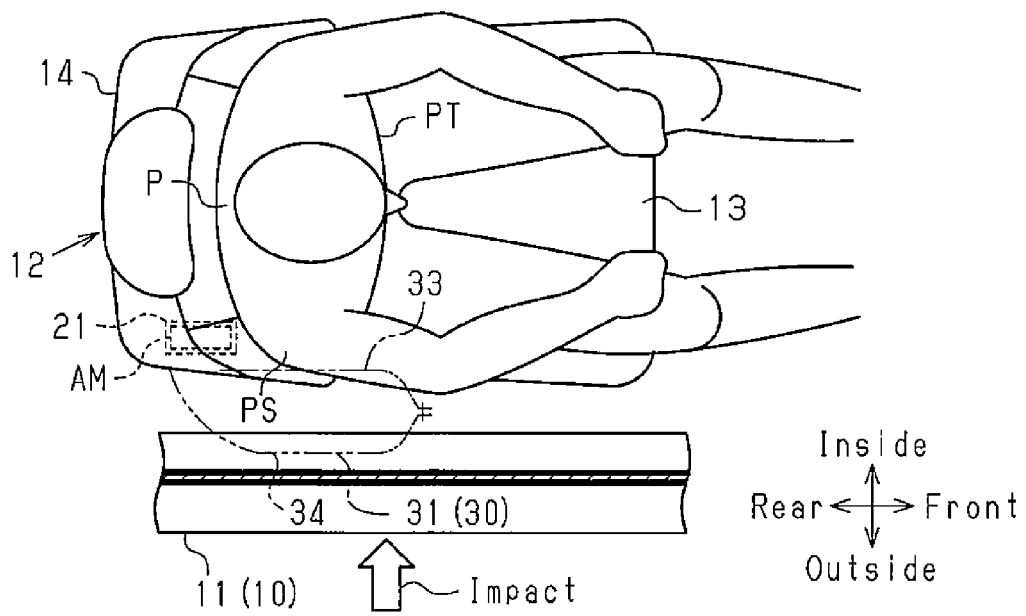
FIG. 2 is a cross-sectional plan view of the positional relationship of the automobile seat, the airbag, the occupant, and a body side portion in the embodiment of FIG. 1.

As shown in FIGS. 1 and 2, a vehicle seat, which is an automobile seat 12 in this embodiment, is arranged on the inner side of a body side portion 11 of an automobile 10. The body side portion 11 refers to an automobile component that is located at a side of the automobile 10 (on the outer side of the automobile seat 12), and mainly corresponds to doors and pillars. For example, part of the body side portion 11 corresponding to the front seat includes a front door, and a center pillar (B-pillar). Part of the body side portion 11 corresponding to the rear seat includes a rear part of the side door (rear door), a C-pillar, a front part of the wheel well, and a rear quarter.

The automobile seat 12 includes a seat cushion 13 and a seat back 14, which extends upward from the rear end of the seat cushion 13. The tilt angle of the seat back 14 is adjustable by a tilt adjusting mechanism (not shown). The automobile seat 12 is arranged in the automobile 10 such that the seat back 14 faces forward. The widthwise direction of the automobile seat 12 thus matches with the widthwise direction of the automobile 10.

The internal structure of a part of the seat back 14 on the outer side will now be described.

A seat frame, which forms a framework of the seat back 14, is incorporated in the seat back 14. As shown in FIG. 3, a part of the seat frame is located in the outer side part of the seat back 14. That part of the seat frame (hereinafter referred to as a side frame portion 17) is formed by bending a metal plate. A seat pad 18, which is made of an elastic material such as urethane foam, is provided on the front side of the seat frame, which includes the side frame portion 17. Also, a hard back board 19, which is formed, for example, of plastic, is arranged on the rear side of the seat frame. Although the seat pad 18 is coated with a cover, the cover is not illustrated in FIG. 3. The same applies to FIG. 19, which will be discussed below.

In the seat pad 18, a storage portion 21 is provided in the vicinity of the outer side part of the side frame portion 17. The storage portion 21 is located at a middle part of the seat back 14 in the vertical direction. The storage portion 21 is also arranged in the vicinity of and diagonally rearward and outward of the occupant P seated in the automobile seat 12 (see FIG. 2). The storage portion 21 accommodates an airbag module AM, which forms a main part of the side airbag apparatus.

The seat pad 18 has a slit 22, which is formed to extend diagonally forward and toward the outer side from the outer front corner of the storage portion 21. A part between a front corner 18c of the seat pad 18 and the slit 22 (a part surrounded by a long dashed double-short dashed line in FIG. 3) forms a breakable portion 23, which is designed to be broken by an airbag 30, which will be discussed below.

The airbag module AM includes as its main components an inflator assembly 25 and the airbag 30. These components will now be described.

<Inflator Assembly 25>

Figure 5:
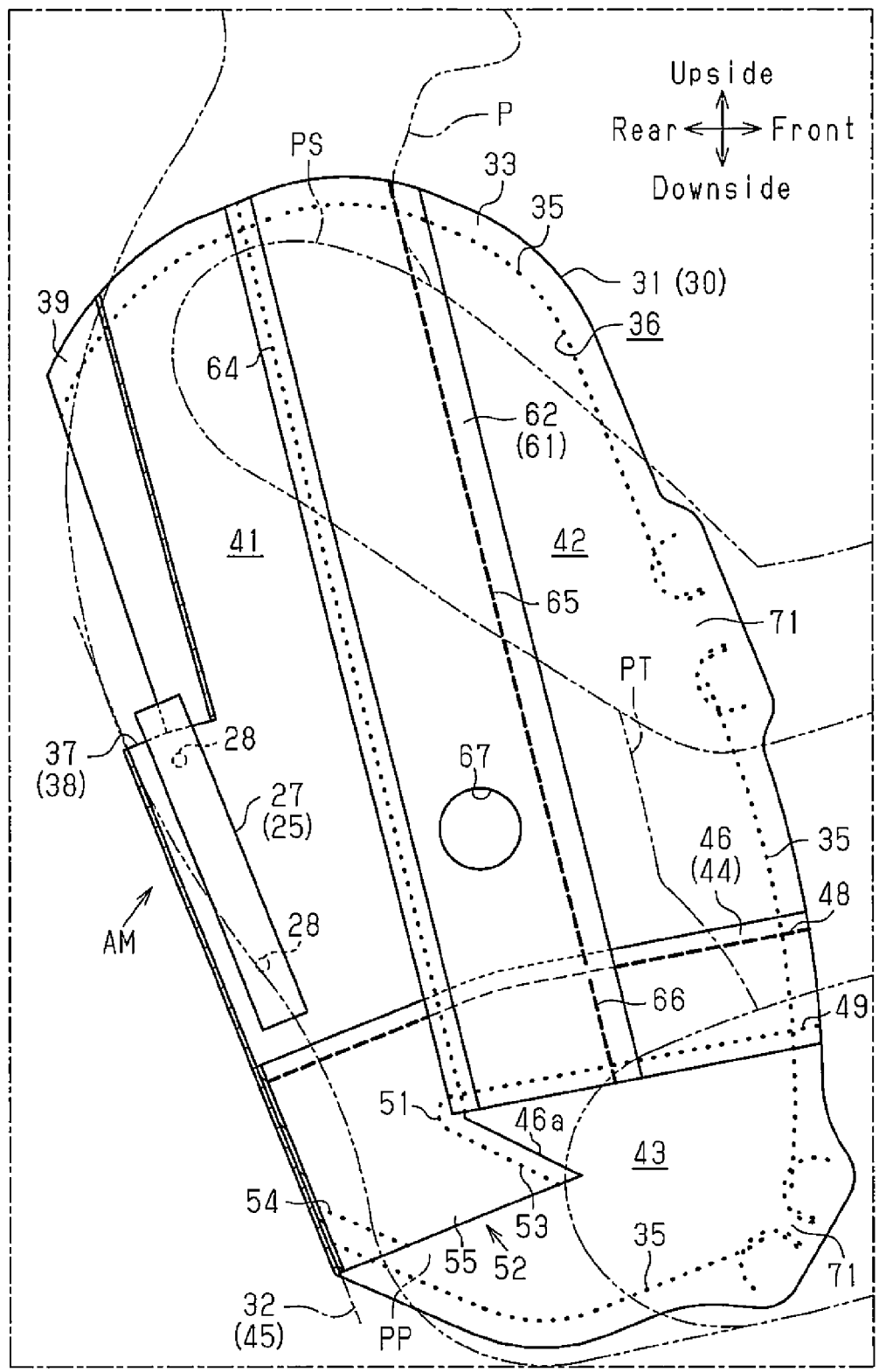
FIG. 5 is a partial cross-sectional side view showing the internal structure of the airbag module shown in FIG. 4, together with an occupant.
Figure 8:
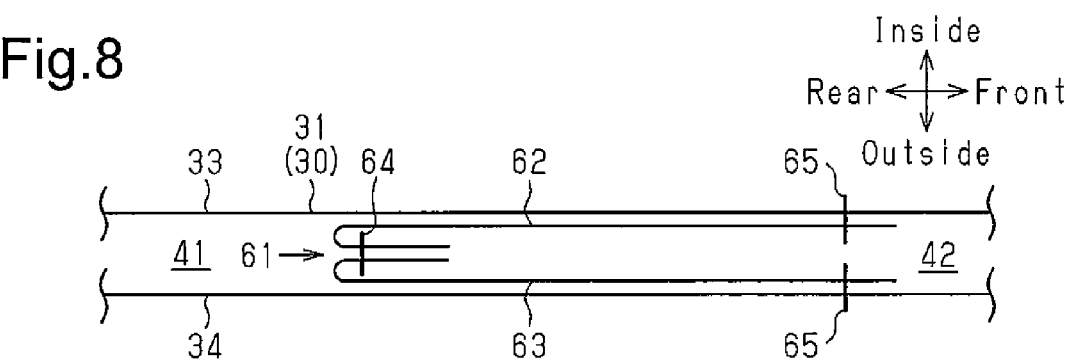
FIG. 8 is a partial cross-sectional view taken along line 8-8 of FIG. 4, schematically showing the internal structure of the airbag.
Figure 9:
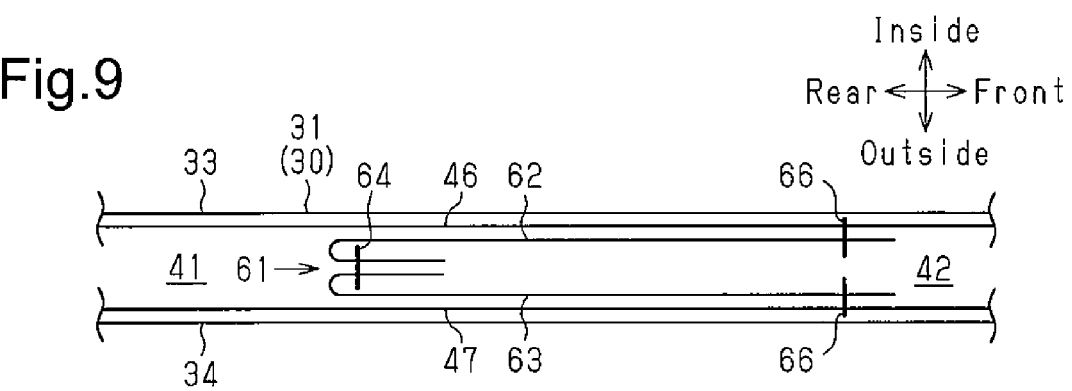
FIG. 9 is a partial cross-sectional view taken along line 9-9 of FIG. 4, schematically showing the internal structure of the airbag.

As shown in FIGS. 3 to 5, the inflator assembly 25 includes a gas generator, which is an inflator 26, and a retainer 27, which surrounds the inflator 26. The inflator 26 of the first embodiment is a pyrotechnic inflator. The inflator 26 is substantially columnar and accommodates a gas generating agent (not shown), which generates inflation gas. The inflator 26 has a gas outlet (not shown) at the lower end. A harness (not shown), which is wiring for sending activating signals to the inflator 26, is connected to the upper end of the inflator 26.

In place of the pyrotechnic inflator using a gas generating agent, it is possible to use a hybrid type inflator as the inflator 26. A hybrid type inflator discharges inflation gas by breaking a partition wall of a high-pressure gas cylinder filled with high-pressure gas with a low explosive.

The retainer 27 functions as a diffuser for controlling the direction of discharged inflation gas and also serves to fasten the inflator 26, together with the airbag 30, to the side frame portion 17. Most of the retainer 27 is formed by bending a plate such as a metal plate into a cylindrical shape that extends substantially in the vertical direction. The retainer 27 of the first embodiment is formed to have a shape that causes a greater amount of inflation gas discharged by the inflator 26 to be supplied to a third inflation chamber 43 than to a first inflation chamber 41, which will be discussed below.

Bolts 28 are fixed to the retainer 27. The bolts 28 extend toward the inner side of the automobile 10 and serve as securing members for attaching the retainer 27 to the side frame portion 17. The inflator 26 and the retainer 27 of the inflator assembly 25 may be an integrated member.

As shown in FIGS. 1 and 2, the outer shape of the airbag 30 is formed by an airbag main body 31.

<Airbag Main Body 31>

FIG. 4 shows the airbag module AM in the state in which the airbag main body 31 is deployed in a planar form without being filled with inflation gas (hereinafter, referred to as an uninflated and deployed state). FIG. 5 shows, together with the occupant P, the airbag module AM, in which the airbag 30 of FIG. 4 is cut at the center portion of the automobile widthwise direction to show the internal structure of the airbag module AM.

As shown in FIGS. 4 to 6, the airbag main body 31 is formed by folding a single fabric piece (also referred to as a base fabric, or a fabric panel) along a first folding line 32 to be overlapped in the automobile widthwise direction, and joining the overlapped parts. To distinguish the two overlapped parts of the airbag main body 31, the part located on the inner side is referred to as a main body fabric portion 33, and the part located on the outer side is referred to as a main body fabric portion 34.

In the first embodiment, the fabric piece is folded in half such that the first folding line 32 is located at the rear end of the airbag main body 31. However, the fabric piece may be folded in half such that the first folding line 32 is located at another end such as the front end, the upper end, or the lower end. The airbag main body 31 may also be formed of two fabric pieces divided along the first folding line 32. In this case, the airbag main body 31 is formed by overlapping two fabric pieces in the automobile widthwise direction, and joining the fabric pieces to each other. Furthermore, the airbag main body 31 may be formed of three or more fabric pieces.

The main body fabric portions 33, 34 are preferably formed of a material having high strength and flexibility to be easily folded. The material may be, for example, woven cloth formed of polyester threads or polyamide threads.

The main body fabric portions 33, 34 are joined at peripheral joint portions 35 provided at the peripheries of the main body fabric portions 33, 34. In the first embodiment, the peripheral joint portions 35 are formed by sewing (with sewing threads) parts of the peripheral portions of the main body fabric portions 33, 34 except for the rear end (the part in the vicinity of the first folding line 32). Sewing is also performed on edge joint portions 48, 49, 53, 64, 65, 66, joint portions 54, and surrounding joint portions 72, 73.

The sewn portions are depicted by first to third different broken lines in FIGS. 4, 5, 7, 11A, 12A, and 18. The same applies to FIGS. 20 and 21, which will be used for describing a second embodiment. The first broken line includes thick lines with a certain length arranged intermittently and represents sewn portions as viewed from the side (refer to the peripheral joint portion 35 in FIG. 4). The second broken line includes thin lines with a certain length (longer than a typical broken line) arranged intermittently, and represents the state of the sewing threads that are located behind the outer side main body fabric portion 34 and cannot be seen directly (refer to the edge joint portions 49 in FIG. 4). The third broken line includes dots arranged at predetermined intervals, and represents a state of sewing threads at the position between the main body fabric portions 33, 34, which are the target of sewing, and between structural fabric portions 46, 47 (see the peripheral joint portion 35 in FIG. 5). That is, the drawings in which the sewn part is represented by the third broken line show the structure along the cross-section that passes through the sewn portion.

As shown in FIGS. 4 to 6, the space between the main body fabric portions 33, 34 and surrounded by the peripheral joint portion 35 serves as an inflation portion 36. When being deployed and inflated by inflation gas beside a region covering most of the upper body of the occupant P (the part from the lumbar region PP to the shoulder PS, the inflation portion 36 restrains the region and protects it from the impact.

The peripheral joint portion 35 may be formed by a method other than sewing using sewing threads. For example, the peripheral joint portion 35 may be formed by adhesion with an adhesive. Such modification may be applied to the edge joint portions 48, 49, 53, 64, 65, 66, the joint portion 54, and the surrounding joint portions 72, 73.

The airbag main body 31, which is folded in half, has a slit 37 at the rear end. The slit 37 is located in a middle portion in the vertical direction and extends in a direction perpendicular to the first folding line 32. A part of the main body fabric portions 33, 34 above the slit 37 forms an inward folding portion 39, which is folded inward in relation to the remaining parts of the airbag main body 31. The upper end of the inward folding portion 39 is sewn and joined to the remaining parts of the main body fabric portions 33, 34 by the upper part of the peripheral joint portion 35. When the inward folding portion 39 is formed, the slit 37 is opened to form an insertion port 38 for the inflator assembly 25.

The inflation portion 36 incorporates a lateral partition 44 and a vertical partition 61. The lateral partition 44 and the vertical partition 61 each have the same structure as a member generally referred to as a tether.

<Lateral Partition 44>

The lateral partition 44 divides the inflation portion 36 into an upper space and a lower space and is formed by folding a single fabric piece, which is made of the same material as the airbag main body 31, along a vertically extending second folding line 45 to be overlapped in the automobile widthwise direction, and installing the overlapped portions to extend between lower parts of the main body fabric portions 33, 34. The lateral partition 44 may also be formed of two fabric pieces divided along the second folding line 45. To distinguish the two overlapped parts of the lateral partition 44, the part located on the inner side is referred to as a structural fabric portion 46, and the part located on the outer side is referred to as a structural fabric portion 47.

Figure 10A:
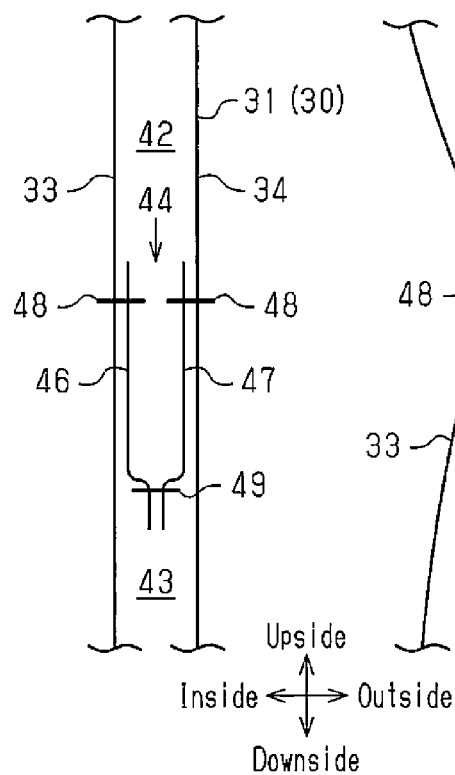
FIG. 10A is a partial cross-sectional view taken along line 10A-10A of FIG. 4, schematically showing the internal structure of the airbag.

As shown in FIGS. 6 and 10A, the structural fabric portions 46, 47 of the lateral partition 44 folded in half have, at the rear ends, extensions 46a, 47a extending substantially downward, respectively. The lateral partition 44, which is folded in half, is located between the main body fabric portions 33, 34 with the second folding line 45 matched with the first folding line 32. The structural fabric portions 46, 47 of the lateral partition 44, which is folded in half, are joined to the main body fabric portions 33, 34 by edge joint portions 48 provided at the upper peripheral portion, respectively. The structural fabric portions 47, 46 are joined to each other by the edge joint portions 49 located at the lower peripheral portions. Further, the front ends of the structural fabric portions 46, 47 of the lateral partition 44, which is folded in half, are joined to the front ends of the main body fabric portions 33, 34 by the peripheral joint portions 35.

A space in the inflation portion 36 below the lateral partition 44 forms a third inflation chamber 43, which is deployed and inflated beside the lumbar region PP of the occupant P.

<Vertical Partition 61>

As shown in FIGS. 4 to 6, the vertical partition 61 divides the space in the inflation portion 36 above the lateral partition 44 into a front space and a rear space. The vertical partition 61 is made of the same material as the airbag main body 31 and includes vertically elongated fabric pieces 62, 63. The fabric pieces 62, 63 are joined to each other by edge joint portions 64 each located on one of the vertically extending edges. The vertical partition 61 may be formed by folding a single fabric piece in half along a vertically extending folding line and overlapping the folded parts in the automobile widthwise direction.

The upper ends of the fabric pieces 62, 63 are joined to the upper ends of the main body fabric portions 33, 34 by the peripheral joint portion 35. The lower parts of the fabric pieces 62, 63 are overlaid onto the structural fabric portions 46, 47 of the lateral partition 44. The lower ends of the fabric pieces 62, 63 are joined to the structural fabric portions 46, 47 by the edge joint portions 49.

Each of the fabric pieces 62, 63 has an edge joint portion 65 located in a part that is not overlaid on the corresponding one of the structural fabric portions 46, 47. Specifically, the edge joint portion 65 is one of a pair of vertically extending side edges that is located on the opposite side from the side on which the edge joint portion 64 is provided. The parts of the fabric pieces 62, 63 are joined to the main body fabric portions 33, 34 by the edge joint portions 65 (see FIG. 8). Parts of the fabric pieces 62, 63 that are overlaid onto the structural fabric portions 46, 47 are joined only to the structural fabric portions 46, 47 by edge joint portions 66, which are provided continuous to and below the edge joint portions 65 (see FIG. 9).

The space in the inflation portion 36 behind the vertical partition 61 is the first inflation chamber 41, which is deployed and inflated beside the shoulder region PS and the rear half of the thorax PT in the upper body of the occupant P. The space in the inflation portion 36 in front of the vertical partition 61 is a second inflation chamber 42, which is deployed and inflated beside the front half of the thorax PT in the upper body of the occupant P. The first inflation chamber 41 is located on the rear side of the second inflation chamber 42 with the vertical partition 61 in between. The first inflation chamber 41 is in the space of the inflation portion 36 above the lateral partition 44 and corresponds to an upstream-side inflation chamber that is formed at a position close to the inflator 26. The second inflation chamber 42 corresponds to a downstream-side inflation chamber that is formed at a position far from the inflator 26.

The lateral partition 44 has an opening 51 and a check valve 52, and the vertical partition 61 has a communication hole 67.

<Opening 51 and Check Valve 52>

The opening 51 is formed to connect the first inflation chamber 41 and the third inflation chamber 43 to each other. The edge joint portions 49 of the lateral partition 44, which is folded in half, are not joined to each other at the rear ends of the structural fabric portions 46, 47. In other words, the edge joint portions 49, which join the structural fabric portions 46, 47 to each other, are absent in an area including the second folding line 45. In this manner, the opening 51 is formed by a disjoined part where the edge joint portions 49 are not provided.

The check valve 52 is configured to restrict the flow of inflation gas at the opening 51. That is, the check valve 52 allows inflation gas to flow from the first inflation chamber 41 to the third inflation chamber 43, but restricts the flow in the opposite direction, or the flow of inflation gas from the third inflation chamber 43 to the first inflation chamber 41.

The front edges of the extensions 46a, 47a of the folded lateral partition 44 are joined to each other by edge joint portions 53 formed along the front edges. The edge joint portions 53 are inclined downward toward the front ends, and the upper ends of the edge joint portions 53 are connected to the rear ends of the edge joint portions 49.

The rear edges of the extensions 46a, 47a of the folded lateral partition 44 are joined to each other by joint portions 54, which extend forward and downward from the opening 51 in an inclined manner. Further, parts of the folded extensions 46a, 47a that are rearward of the joint portions 54 are joined to the rear lower ends of the main body fabric portions 33, 34 by the above described peripheral joint portions 35.

A part of the extension 46a on the inner side that is surrounded by the opening 51, the edge joint portion 53, and the joint portion 54 forms a valve member 55 on the inner side of the check valve 52. Likewise, a part of the outer extension 47a that is surrounded by the opening 51, the edge joint portion 53, and the joint portion 54 forms a valve member 56 on the outer side of the check valve 52.

The check valve 52 allows flow of inflation gas when one of the valve members 55, 56 is separated from the other. This state of the check valve 52 is referred to as a valve opened state. The check valve 52 restricts flow of inflation gas when the valve members 55, 56 contact each other in at least parts thereof. This state of the check valve 52 is referred to as a valve closed state.

<Communication Hole 67>

The communication hole 67 is formed to connect the first inflation chamber 41 and the second inflation chamber 42 to each other. In the first embodiment, a circular hole is formed in each of the fabric pieces 62, 63 to serve as the communication hole 67.

Each of the fabric pieces 62, 63 may have two or more communication holes 67. Only one of the fabric pieces 62, 63 may have a communication hole 67. In a case in which the vertical partition 61 is formed by folding a single fabric piece in half, the communication hole 67 may be formed on a folding line of the vertical partition 61. In this case, the number of the communication holes 67 may be one or greater than one.

Further, the airbag main body 31 has vent holes 71 for discharging inflation gas.

<Vent Holes 71>

The vent holes 71 are each formed in the front end portion of the second inflation chamber 42 and the front lower end of the third inflation chamber 43. The structures for forming the vent holes 71 are the same. Therefore, the structure for forming the vent hole 71 for the second inflation chamber 42 will be described, and description of the structure for forming the vent hole 71 for the third inflation chamber 43 will be omitted.

As shown in FIG. 7, a part of the peripheral joint portion 35 is not joined so that a pair of separated ends 35a, 35b is formed. The airbag main body 31 has a surrounding joint portion 72, which joins the main body fabric portions 33, 34 to each other while surrounding the end 35a, and a surrounding joint portion 73, which joins the main body fabric portions 33, 34 while surrounding the end 35b. A part between the main body fabric portions 33, 34 and between the surrounding joint portions 72, 73 does not function to join the peripheries of the main body fabric portions 33, 34 to each other. The part is formed as a vent hole 71, which connects the inside of the second inflation chamber 42 to the outside to discharge inflation gas in the second inflation chamber 42 to the outside.

Figure 17:
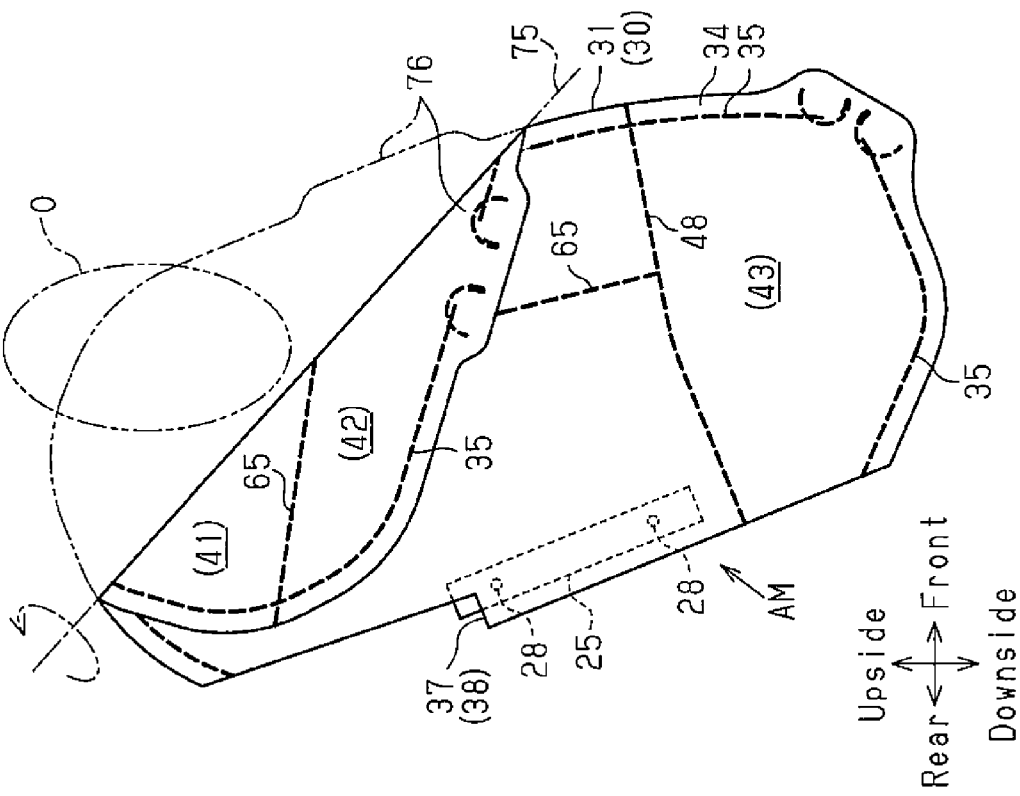
FIG. 17 is an explanatory side view showing a process in which the third folding of the airbag in the storage form is unfolded in the embodiment of FIG. 1.

The airbag 30 in the uninflated and deployed state (see FIGS. 4 and 5) is folded as shown in FIG. 3, so that the airbag module AM has a compact form shown in FIGS. 16 and 17 (hereinafter, referred to as a storage form). The airbag module AM is folded in this manner so that it is suitable for being accommodated in the storage portion 21 having a limited size in the seat back 14. The storage form is achieved by performing first folding, second folding, and third folding on the airbag 30 in an uninflated and deployed state. The folding operations will now be described.

<First Folding>

The first folding is performed using a third folding line 75 to fold an upper portion of the airbag 30 in the uninflated and deployed state shown in FIG. 4, except for the part that surrounds the inflator assembly 25. Specifically, the first folding is performed on the first inflation chamber 41 and the second inflation chamber 42. In the first folding, as shown by a long dashed short dashed line, a straight third folding line 75 is set to extend to be inclined in the front-rear direction in an upper portion of the airbag 30 in the uninflated and deployed state. In the first embodiment, the third folding line 75 bridges the first inflation chamber 41 and the second inflation chamber 42 and is inclined to be lowered toward the front end. The third folding line 75 extends through a section slightly below the vent hole 71 at the front end of the second inflation chamber 42 and through a section slightly rearward of the upper end of the edge joint portions 64 in the vertical partition 61. A fold-back portion 76, which is forward of and above the third folding line 75, is folded back toward the outer side and downward along the third folding line 75 as indicated by a long dashed double-short dashed line in FIG. 4, that is, in a direction away from the occupant P. Therefore, the fold-back portion 76 of the airbag main body 31, which is folded back in the first folding, includes the vent hole 71 at the front end of the second inflation chamber 42. Also, the fold-back portion 76 includes a part of the first inflation chamber 41 and a part of the second inflation chamber 42. Thus, by performing the first folding, a part of the fold-back portion 76 is overlaid on an upper part of the first inflation chamber 41 among the parts that are not included in the parts on which the first folding is performed.

<Second Folding>

The second folding is performed using fourth folding lines 77 and fifth folding lines 78 on the airbag 30 after the first folding is performed to fold the airbag 30 from the front toward the rear. The second folding includes accordion-folding performed on a bag rear portion 30r, which is a part close to the part in the airbag 30 that surrounds the inflator assembly 25, and roll-folding performed on a bag front portion 30f, which is adjacent to and forward of the bag rear portion 30r.

The bag rear portion 30r includes a part of the first inflation chamber 41, and the bag front portion 30f includes most of the second inflation chamber 42.

At the accordion-folding, a plurality of vertically extending fourth folding lines 77 is set in the bag rear portion 30r as shown in FIG. 11A. The fourth folding lines 77 are parallel with each other. The distance between adjacent fourth folding lines 77 corresponds to a folding width of the accordion-folding. As shown in FIGS. 12A and 12B, a part of the first inflation chamber 41 and a part of the third inflation chamber 43 are folded in an accordion form along the fourth folding lines 77. More specifically, the bag rear portion 30r is repeatedly folded rearward from the front by a constant width while alternating the folding direction. The part on which the accordion-folding is performed includes a part of the fold-back portion 76, which is folded back along the third folding line 75.

At the roll-folding, a plurality of vertically extending fifth folding lines 78 is set in the bag front portion 30f as shown in FIG. 12A. The fifth folding lines 78 are parallel with each other. The bag front portion 30f is spirally and successively folded rearward from the front along the fifth folding lines 78. In other words, the bag front portion 30f is repeatedly folded in the same direction.

As a result, as shown in FIGS. 13A and 13B, the bag rear portion 30r, which has been accordion-folded, is located in front of the inflator assembly 25, and the bag front portion 30f, which has been roll-folded, is located in front of the bag rear portion 30r. As described above, the second folding is performed using the fourth folding lines 77 and the fifth folding lines 78.

In the first embodiment, the bag front portion 30f is folded in a manner circumvoluting the surface on the outer side into the inside of a vortex. That is, the bag front portion 30f is repeatedly folded in the same direction. As a result of the folding operation, the boundary between the bag rear portion 30r and the bag front portion 30f is located on the outer side (the upper side as viewed in FIG. 13B). In the bag rear portion 30r, the boundary between the accordion-folded part and the non-folded part (the part that surrounds the inflator assembly 25) is located on the outer side. In this case, the roll-folded bag front portion 30f is unfolded toward the body side portion 11. Thus, the bag front portion 30f is easily deployed along the body side portion 11.

The order in which the accordion-folding and the roll-folding are performed is not limited. For example, the accordion-folding and the roll-folding may be performed simultaneously. After the second folding (the accordion-folding and the roll-folding) is performed, the airbag 30 is turned into a transitional form, which is small in the front-rear direction and elongated in the vertical direction as shown in FIGS. 13A and 13B.

<Third Folding>

The third folding is performed using a sixth folding line 79 on one of the upper portion and the lower portion of the airbag apparatus 30 in the transitional form on which part the first folding has been performed (the upper portion in the first embodiment). The third folding is performed to fold the part away from the occupant P. More specifically, in a part above the inflator assembly 25 in the airbag 30 in the transitional form, a sixth folding line 79 extending in the automobile widthwise direction is set as shown in FIG. 15. In the airbag 30 in the transitional form, an upper portion 30u above the sixth folding line 79 is folded rearward and downward about the sixth folding line 79 as indicated by an arrow in FIG. 15. As described above, the third folding is performed using the sixth folding line 79.

The lower portion of the airbag 30 in the transitional form is not subjected to the third folding. More specifically, in a part below the inflator assembly 25 in the airbag 30 in the transitional form, a seventh folding line 81 extending in the automobile widthwise direction is set as shown in FIG. 13A. In the airbag 30 in the transitional form, a lower portion 301 below the seventh folding line 81 is folded back forward and upward about the seventh folding line 81 as indicated by an arrow in FIG. 13A. Further, an eighth folding line 82 is set in the folded back lower portion 301 as shown in FIG. 14. The part above the eighth folding line 82 is folded back forward and downward about the eighth folding line 82 as indicated by an arrow in FIG. 14. These two folding-back actions reduces the vertical dimension of the airbag 30 as illustrated in FIG. 15.

The folding-back actions performed on the upper portion and the lower portion of the airbag 30 in the transitional form turn the airbag 30 into the storage form, which has small front-rear and vertical dimensions and is suitable for being stored in the narrow storage portion 21.

The lower portion of the transitional form may be folded back at the same time or after the upper portion is folded back.

Thereafter, the airbag module AM is held in the storage form by holding means, such as a binding tape (not shown).

As shown in FIG. 3, the airbag module AM in the storage form is arranged in the storage portion 21. The inflator assembly 25 is arranged at the rear, and the accordion-folded bag rear portion 30r and the roll-folded bag front portion 30f are arranged at the front. As described above, the bolts 28, which extend from the retainer 27 and are inserted in the airbag 30, are inserted in the side frame portion 17 and fastened with nuts 29. This secures the inflator assembly 25 to the side frame portion 17 together with the airbag 30.

The inflator assembly 25 may be fixed to the side frame portion 17 using members other than the bolt 28 and the nut 29.

As shown in FIG. 1, the side airbag apparatus includes an impact sensor 85 and a control device 86 in addition to the above-described airbag module AM. The impact sensor 85 is configured by, for example, an acceleration sensor. The impact sensor 85 is provided on the body side portion 11 of the automobile to detect an impact applied from the side to the body side portion 11. The control device 86 controls operation of the inflator 26 based on a detection signal from the impact sensor 85.

The automobile 10 is equipped with a seat belt apparatus for restraining the occupant P seated on the automobile seat 12. However, illustration of the seat belt apparatus is omitted in FIG. 1 and other drawings.

Operation of the side airbag apparatus according to the first embodiment, which is configured as described above, will now be described.

When the impact sensor 85 does not detect any impact applied to the side of the body side portion 11 as shown in FIGS. 1 and 2, the control device 86 outputs no signal for activating the inflator 26 to the inflator 26. Thus, the inflator 26 does not discharge inflation gas. The airbag 30 thus remains stored in the storage portion 21 in the storage form with the inflator assembly 25 (see FIG. 3).

When the impact sensor 85 detects that an impact of a magnitude greater than or equal to a predetermined value has been applied to the body side portion 11 due to a side collision or the like while the automobile 10 is running, the control device 86, based on the detection signal, outputs a signal for activating the inflator 26 to the inflator 26. In response to the signal, the inflator 26 discharges inflation gas from the gas outlet.

Some of the inflation gas discharged by the inflator 26 is supplied to the first inflation chamber 41 of the airbag 30 in the storage form, which starts inflating the first inflation chamber 41. Inflation gas the amount of which is greater than that delivered to the first inflation chamber 41 is delivered to the check valve 52. During the period in which inflation gas is being supplied to the check valve 52, a force that deforms the valve members 55, 56 into a tubular shape is generated. The inflation gas therefore flows into the third inflation chamber 43 through the opening 51 and through between the valve members 55, 56, which starts inflating the third inflation chamber 43. The continuous supply of the inflation gas from the inflator 26 increases the internal pressures of the first and third inflation chambers 41 and 43. Since the third inflation chamber 43 receives a greater amount of inflation gas than the first inflation chamber 41, the internal pressure of the third inflation chamber 43 is higher than that of the first inflation chamber 41. The inflation of the first inflation chamber 41 and the third inflation chamber 43 pulls the vertical partition 61 and the lateral partition 44 toward the ends in the automobile widthwise direction.

As the inflation of the first inflation chamber 41 progresses, the inflation gas in the first inflation chamber 41 flows into the second inflation chamber 42 via the communication hole 67, so that the second inflation chamber 42 starts inflating with a delay from the first inflation chamber 41.

Figure 19:
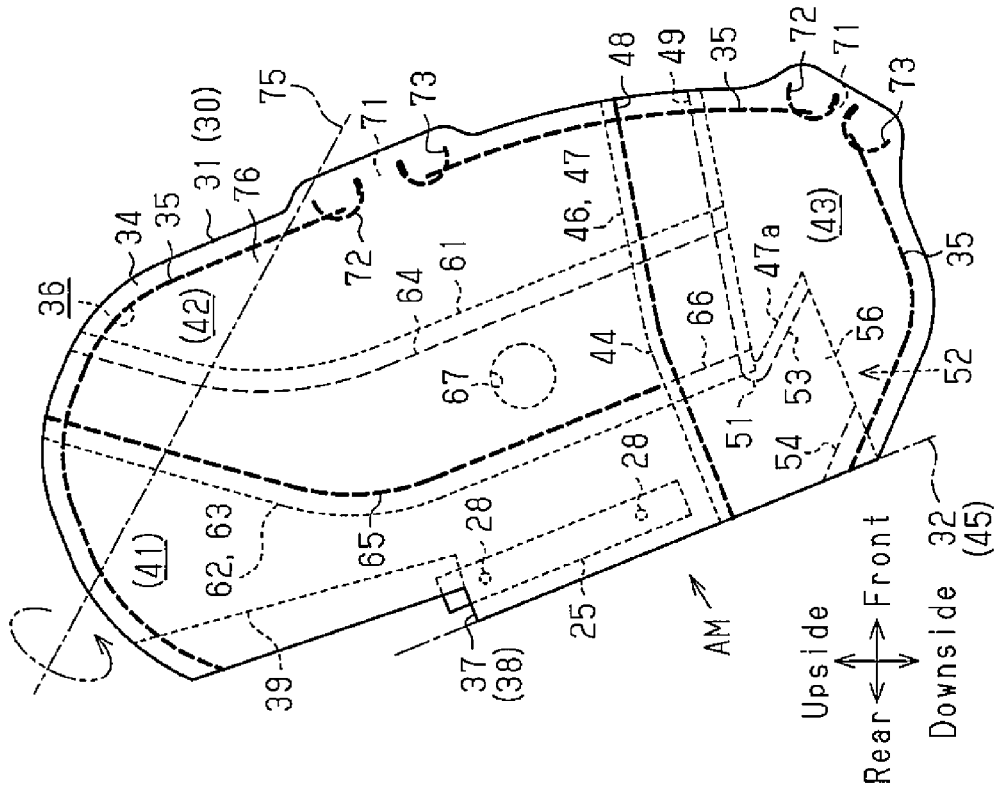
FIG. 19 is a partial cross-sectional plan view illustrating a state in which the airbag of FIG. 3 has been projected from the automobile seat to be deployed and inflated with a part remaining in the seat back.

The third inflation chamber 43, the first inflation chamber 41, and the second inflation chamber 42 are inflated, while being unfolded in the reverse order of the folding order, that is, in the order of the third folding, the second folding, and the first folding. This is because parts in the airbag 30 that were folded in later stages restrict parts that were folded in earlier stages from being unfolded. The airbag 30, which is deployed and inflated in the above described manner, pushes the seat pad 18 of the seat back 14, so that the seat pad 18 is broken at the breakable portion 23 (see FIG. 3). As shown in FIG. 19, the airbag 30 is projected forward from the seat back 14 through the broken portion with a part of the airbag 30 remaining in the storage portion 21.

Subsequently, the airbag 30, which continues being supplied with inflation gas, is deployed while being unfolded forward between the body side portion 11 and the upper body of the occupant P seated in the automobile seat 12 as indicated by long dashed double-short dashed lines in FIG. 2. As shown in FIG. 5, the third inflation chamber 43, the internal pressure of which is the highest among the first to third inflation chambers, is deployed and inflated beside the lumbar region PP, which has the highest impact resistance in the side of the occupant P. The first inflation chamber 41, the internal pressure of which is the second highest after the third inflation chamber 43, is deployed and inflated beside the shoulder region PS, which has a higher impact resistance than the front half of the thorax PT, and beside the rear half of the thorax PT. The second inflation chamber 42, the internal pressure of which is lower than the first inflation chamber 41, is deployed and inflated beside the front half of the thorax PT, which has a lower impact resistance than the shoulder region PS and the rear half of the thorax PT.

Figure 10B:
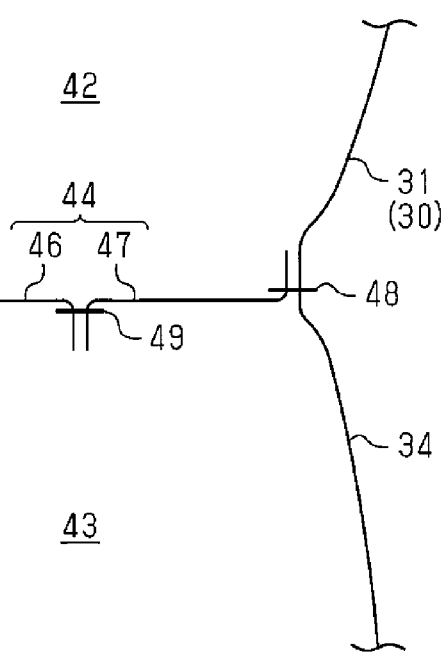
FIG. 10B is a partial cross-sectional view schematically showing the internal structure of the airbag lower portion when the lateral partition of FIG. 10A is tensioned.

As shown in FIG. 19, the vertical partition 61 is tensioned when pulled toward the opposite sides in the automobile widthwise direction. The tensioned vertical partition 61 limits the inflation of the first and second inflation chambers 41, 42 in the automobile widthwise direction. As shown in FIG. 10B, the lateral partition 44 is also tensioned when pulled toward the opposite sides in the automobile widthwise direction. The tensioned lateral partition 44 limits the inflation of the third, first and second inflation chambers 43, 41, 42 in the automobile widthwise direction.

The airbag 30, in which the third inflation chamber 43, the first inflation chamber 41, and the second inflation chamber 42 are each deployed and inflated as described above, is located between the upper body of the occupant P and the inwardly bulging body side portion 11. The airbag 30 pushes the upper body of the occupant P inward of the automobile and restrains the upper body. The side impact transmitted to the upper body of the occupant P through the body side portion 11 is reduced by the airbag 30 so that the upper body of the occupant P is protected.

Since the second inflation chamber 42 starts being inflated with a delay from the first inflation chamber 41, the momentum of the deployment of the airbag 30 is weaker than the case in which the second inflation chamber 42 and the first inflation chamber 41 simultaneously start being inflated. Therefore, even if an obstacle O exists in front of the airbag 30 (see a long dashed double-short dashed line in FIG. 17), the obstacle O is prevented from being thrust by the airbag 30, which is being deployed.

When the discharge of inflation gas from the inflator 26 stops and the inflation gas in the third inflation chamber 43 acts to flow to the first inflation chamber 41 via the check valve 52, the valve members 55, 56 of the check valve 52 are pushed by the high pressure in the third inflation chamber 43 and contact each other. When the check valve 52 is closed, the inflation gas in the third inflation chamber 43 is restricted from flowing back to the first inflation chamber 41 through between the valve members 55, 56 and the opening 51. Therefore, the internal pressure of the third inflation chamber 43, which has been increased to a level adequate for protecting the lumbar region PP of the occupant P, is prevented from being lowered by backflow of the inflation gas to the first inflation chamber 41.

When the airbag 30 restrains the occupant P, the part about each vent hole 71 in the main body fabric portions 33, 34 is deformed to be tubular, so that the vent hole 71 is open. Excess inflation gas in the second inflation chamber 42 is discharged forward of the airbag 30 via the vent hole 71 located at the front end of the second inflation chamber 42. Likewise, excess inflation gas in the third inflation chamber 43 is discharged forward of the airbag 30 via the vent hole 71 located at the front lower part of the third inflation chamber 43. In this manner, when the occupant P is restrained by the airbag 30, the internal pressures of the second inflation chamber 42 and the third inflation chamber 43 are lowered, so that the occupant P is pushed with an adequate pressing force.

The restraint and protection of the occupant P by the airbag 30 and the basic restriction of pressing on the obstacle O are performed as described above. In the first embodiment, the manner in which the airbag 30 is folded is contrived, so that various operations described below are obtained when the airbag 30 is unfolded. The operations include restriction of the pressing on the obstacle O.

The operation of unfolding the third folding, which is performed using the sixth folding line 79, is as follows. In the airbag 30 in the storage form, the upper portion 30u, which was folded back rearward and downward along the sixth folding line 79 as shown in FIG. 17, is rotated rearward and upward about the sixth folding line 79 as illustrated by the arrow of a long dashed double-short dashed line in FIG. 17. The direction of the rotation is a direction away from the obstacle O, which is located in front of the airbag 30. Therefore, the obstacle O is prevented from being thrust at the unfolding of the third folding of the airbag 30.

Further, although the space between the shoulder region PS of the occupant P and the body side portion 11 is narrow, the rotation of the upper portion 30u is not directed to that space but to a large area that is rearward of the space (see FIG. 2). Thus, when the upper portion 30u is rotated rearward and upward about the sixth folding line 79, the upper portion 30u is unlikely to contact the shoulder region PS of the occupant P or the body side portion 11, so that the third folding is smoothly unfolded.

In the bag rear portion 30r and the bag front portion 30f, on which the second folding from the front to the rear was performed, the bag rear portion 30r is accordion-folded so that it is easily unfolded and deployed. Thus, when the bag rear portion 30r and the bag front portion 30f are unfolded, the bag rear portion 30r, which is desired to be quickly deployed and inflated, is quickly deployed and inflated. Although the bag front portion 30f, which is roll-folded, is less easily unfolded than an accordion-folded part, the deployment of the bag front portion 30f is unlikely to be hindered by an obstacle located on the path of the deployment.

Figure 18:
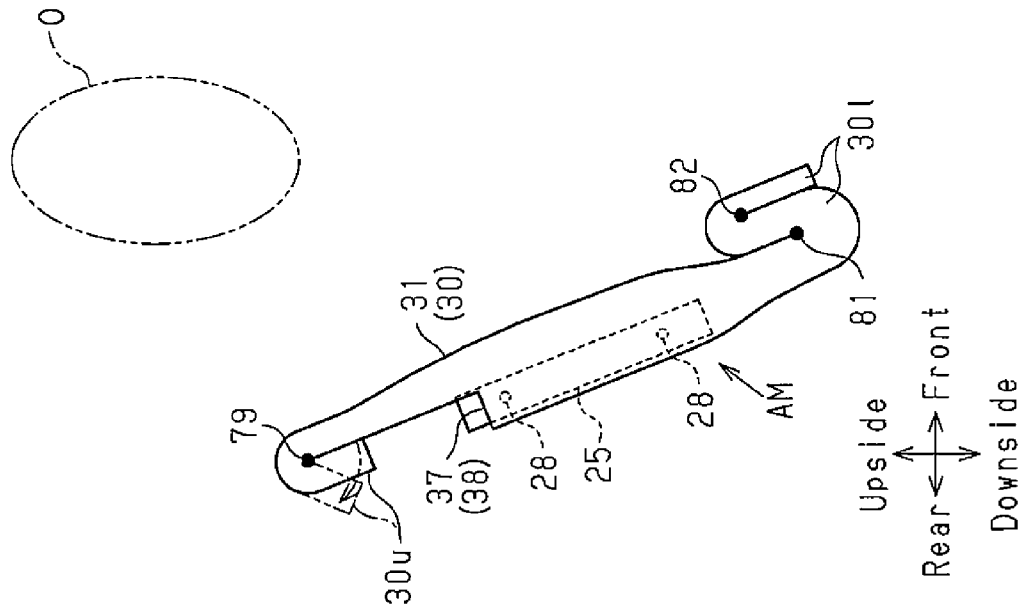
FIG. 18 is an explanatory side view showing a process in which the first folding of the airbag is unfolded in the embodiment of FIG. 1.

At the unfolding of the second folding using the fourth folding lines 77 and the fifth folding lines 78, the fold-back portion 76, which was folded back in the first folding using the third folding line 75, resists the unfolding of the second folding as shown in FIG. 18, thereby restricting the forward deployment and inflation of the airbag 30 from the rear. Therefore, the speed of the forward deployment and inflation from the rear is reduced compared to that in a case in which the second folding is performed without performing the first folding. Therefore, the obstacle O in front of the airbag 30 is prevented from being thrust at the unfolding of the second folding of the airbag 30.

In a period in which the second folding is being unfolded and before the first folding is unfolded, the inflation gas is unlikely to flow to the fold-back portion 76, which was folded back in the first folding and is unlikely to be discharged through the vent hole 71 formed in the fold-back portion 76. Thus, the part of the first inflation chamber 41 that was subjected to the first folding is efficiently deployed and inflated with the inflation gas and properly restrains the shoulder region PS and the rear half of the thorax PT of the occupant P.

As shown in FIG. 18, a part of the fold-back portion 76, which was folded back along the third folding line 75 in the first folding, overlaps a section of the part that was not subjected to the first folding (including a part of the first inflation chamber 41). In contrast, supply of the inflation gas to parts of the first inflation chamber 41 and the second inflation chamber 42 that were not subjected to the first folding starts earlier than supply of the inflation gas to the fold-back portion 76, so that the parts start being deployed and inflated. That is, before the fold-back portion 76 is supplied with the inflation gas, the part that was not subjected to the first folding is inflated. Therefore, when the first folding is unfolded, the fold-back portion 76 is unfolded while being pushed by a part of the first inflation chamber 41 that was not subjected to the first folding and is inflated earlier than the fold-back portion 76. The pressing force promotes unfolding of the first folding.

Triggered by the start of unfolding of the first folding, which was performed using the third folding line 75, the inflation gas flows into the fold-back portion 76 and is discharged from the vent hole 71 located at the fold-back portion 76. This lowers the internal pressure of the second inflation chamber 42, so that the occupant P is pushed by the second inflation chamber 42 with an adequate pressing force.

Further, at the unfolding of the first folding, the fold-back portion 76, which was folded back to the outer side with respect to the third folding line 75 in the airbag 30, is rotated to the outer side (forward and upward) with respect to the third folding line 75, as indicated by the arrow of the long dashed double-short dashed line in FIG. 18. The direction of the rotation is a direction away from the obstacle O. Therefore, the obstacle O is prevented from being thrust at the unfolding of the first folding.

The first embodiment as described above has the following advantages.

(1) The present invention is applied to the airbag 30, the interior of which is divided into at least the first inflation chamber 41 (an upstream-side inflation chamber) and the second inflation chamber 42 (a downstream-side inflation chamber) by the vertical partition 61. The first to third folding operations (FIGS. 11A, 11B to 15) are performed on the airbag 30 in the uninflated and deployed state to turn the airbag 30 into the storage form (FIG. 16). In the first folding, the upper portion 30u of the airbag 30 is folded back to the outer side, that is, in the direction away from the occupant P, along the third folding line 75, which is inclined to be lower toward the front end with respect to the front-rear direction (FIGS. 4 and 11A). In the second folding, the airbag 30, which has been subjected to the first folding, is folded rearward from the front using the fourth folding lines 77 and the fifth folding lines 78 (FIGS. 11A to 13B). In the third folding, the upper portion 30u of the airbag 30 in the transitional form, which has been subjected to the second folding, is folded back rearward and downward, or in the direction away from the occupant P, using the sixth folding line 79 (FIGS. 15 and 16).

Therefore, even if the obstacle O exists in front of the airbag 30, the obstacle O is further reliably prevented from being thrust by the airbag 30, which is being deployed.

(2) A vent hole 71 is formed at the front end of the second inflation chamber 42, and the fold-back portion 76, which is folded back in the first folding of the airbag 30, includes the vent hole 71.

Therefore, after the first inflation chamber 41 adequately restrains the rear half of the upper body of the occupant P, excess inflation gas in the second inflation chamber 42 is allowed to be discharged through the vent hole 71.

(3) The third folding line 75 bridges the first inflation chamber 41 and the second inflation chamber 42 (FIG. 4).

Therefore, the fold-back portion 76, which was folded back in the first folding using the third folding line 75, is pushed by a part of the inflation portion 36 that is not included in the part subjected to the first inflation operation (particularly, the first inflation chamber 41). This promotes unfolding of the first folding.

(4) In the second folding, which uses the fourth folding lines 77 and the fifth folding lines 78, the bag rear portion 30r is accordion-folded, and the bag front portion 30f is roll-folded (FIGS. 11A, 11B, 12A, 12B).

Thus, the bag rear portion 30r, which is desired to be more quickly deployed and inflated, can be quickly deployed and inflated forward. Further, the bag front portion 30f is deployed in a more favorable manner between the narrow space between the occupant P and the body side portion 11, which is bulging toward the automobile seat 12.

Second Embodiment

An automobile side airbag apparatus according to a second embodiment of the present invention will now be described with reference to FIGS. 20 and 21.

The main differences of the second embodiment from the first embodiment are the following two points.

(i) Vertical Partition 61

In the second embodiment, the shape of the fabric pieces 62, 63, which form the vertical partition 61, is different from that in the first embodiment. When the airbag main body 31 is in the uninflated and deployed state, the upper parts of the fabric pieces 62, 63 are inclined forward.

Contrary to the first embodiment, the fabric pieces 62, 63 are joined to each other by edge joint portions 64 provided on the front edges.

Parts of the fabric pieces 62, 63 that are not overlaid onto the structural fabric portions 46, 47 are joined to the main body fabric portions 33, 34 by edge joint portions 65 provided along the rear edges. Parts of the fabric pieces 62, 63 that are overlaid onto the structural fabric portions 46, 47 are joined only to the structural fabric portions 46, 47 by edge joint portions 66, which are provided continuous to and below the edge joint portions 65.

The fabric pieces 62, 63 each have the front and rear edges, and the edge joint portions 64, which join the fabric pieces 62, 63 to each other, are provided on the front edges, which are relatively far from the inflator assembly 25. Therefore, although the fabric pieces 62, 63 are joined to the main body fabric portions 33, 34 at further rearward positions, the edge joint portions 64 are unlikely to contact the inflator assembly 25.

Since the shape of the fabric pieces 62, 63 is changed as described above, the shapes of the first inflation chamber 41 and the second inflation chamber 42 are different from those in the first embodiment. However, the second embodiment is similar to the first embodiment in that the first inflation chamber 41 is deployed and inflated beside the shoulder region PS and the rear half of the thorax PT in the upper body of the occupant P and that the second inflation chamber 42 is deployed and inflated beside the front half of the thorax PT in the upper body of the occupant P. The second embodiment is also similar to the first embodiment in that the first inflation chamber 41 is in the space of the inflation portion 36 above the lateral partition 44 and corresponds to an upstream-side inflation chamber that is formed at a position close to the inflator 26, and that the second inflation chamber 42 corresponds to a downstream-side inflation chamber that is formed at a position far from the inflator 26.

(ii) First Folding

According to the second embodiment, in the airbag 30 in the storage form, a part displaced upward from the vent hole 71 provided at the front end of the second inflation chamber 42 is folded back in the first folding using the third folding line 75.

Figure 20:
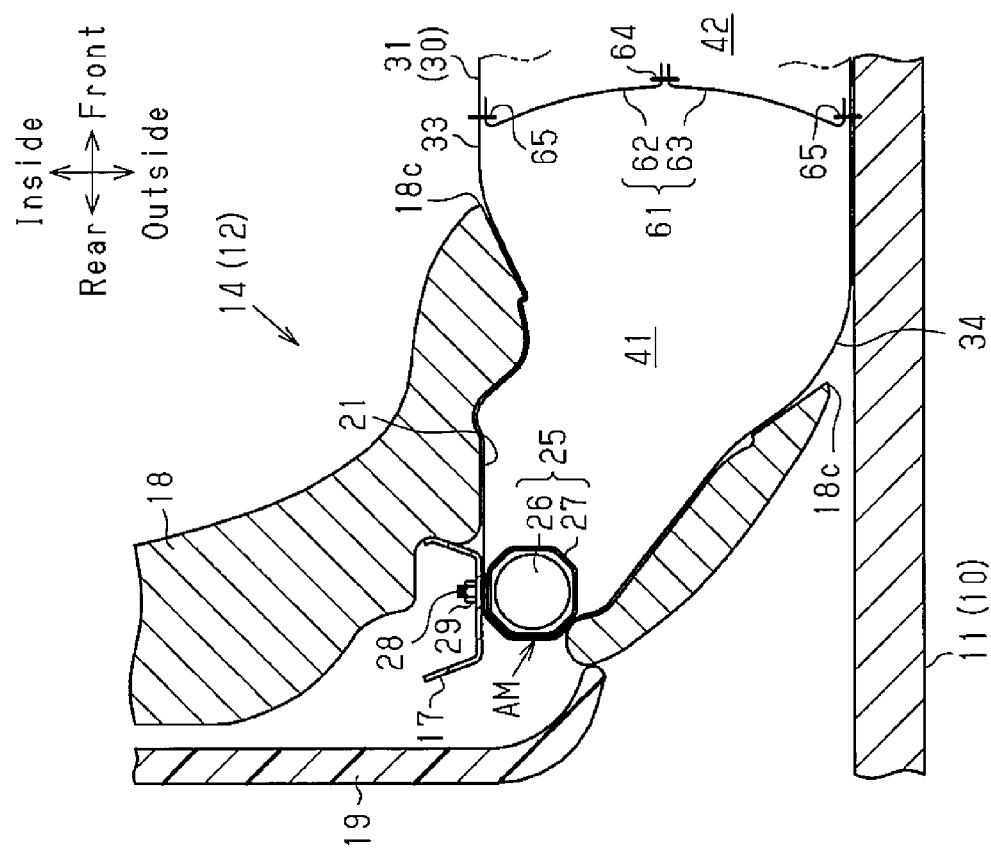
FIG. 20 is a side view that corresponds to FIG. 4 and shows an automobile side airbag apparatus according to a second embodiment, illustrating the airbag module with an airbag in an uninflated and deployed state.

In the first folding, as shown by a long dashed short dashed line in FIG. 20, a straight third folding line 75 is set to extend to be inclined in the front-rear direction in an upper portion of the airbag 30 in the uninflated and deployed state. In the second embodiment, the third folding line 75 bridges the first inflation chamber 41 and the second inflation chamber 42 and is inclined to be lowered toward the front end as in the first embodiment. However, the third folding line 75 extends through a section slightly above the vent hole 71 located at the front end of the second inflation chamber 42 and through a section rearward of the upper end of the edge joint portion 64 in the vertical partition 61. Therefore, the size of the fold-back portion 76 forward of and above the third folding line 75 is smaller than that in the first embodiment. The fold-back portion 76 is folded back toward the outer side and downward along the third folding line 75 as indicated by a long dashed double-short dashed line in FIG. 20, that is, in a direction away from the occupant P. Thus, the fold-back portion 76 of the airbag 30, which is folded back in the first folding, does not include the vent holes 71. Also, the fold-back portion 76 includes a part of the first inflation chamber 41 and a part of the second inflation chamber 42. Thus, by performing the first folding, a part of the fold-back portion 76 is overlaid on upper portions of the first and second inflation chambers 41, 42 among the parts that are not included in the parts on which the first folding is performed.

Other than these differences, the second embodiment is the same as the first embodiment. Thus, like or the same reference numerals are given to those components that are like or the same as the corresponding components described above in the first embodiment and detailed explanations are omitted.

The vent hole 71 formed at the front end of the second inflation chamber 42 is not included in the fold-back portion 76, which is folded back in the first folding of the airbag 30. Therefore, discharge of the inflation gas from the vent hole 71 is unlikely to be influenced by whether the first folding is unfolded or not.

Therefore, in a period during the unfolding of the second folding and before the unfolding of the first folding, the inflation gas in the second inflation chamber 42 is discharged from the vent hole 71.

In the airbag 30, the shape of the vertical partition 61 is different from that in the first embodiment. Accordingly, the shapes of the first inflation chamber 41 and the second inflation chamber 42 are different from those in the first embodiment. However, as in the case of the first embodiment, the first inflation chamber 41 is deployed and inflated beside the shoulder region PS and the rear half of the thorax PT. The second inflation chamber 42 is deployed and inflated beside the front half of the thorax PT.

The second embodiment achieves the same advantages as the above described advantages (1), (3), and (4). Further, instead of the above described advantage (2), the second embodiment achieves the following advantage.

(5) A vent hole 71 is formed at the front end of the second inflation chamber 42, and the fold-back portion 76, which does not include the vent hole 71, is folded back in the first folding in the airbag 30 in the storage form.

Thus, even if the fold-back portion 76 contacts the body side portion 11 during unfolding of the first folding and hinders the unfolding, the inflation gas in the second inflation chamber 42 is discharged from the vent holes 71.

The above embodiments may be modified as follows.

<Regarding Manner in which Airbag 30 is Folded>

At the roll-folding of the bag front portion 30f, the bag front portion 30f may be repeatedly folded in the same direction such that the surface on the inner side is circumvoluted into the inside of a vortex as shown in FIG. 22A, contrary to the above illustrated embodiments. In this case, the boundary between the bag rear portion 30r and the bag front portion 30f is located on the inner side. In the bag rear portion 30r, the boundary between the accordion-folded part and the non-folded part (the part that surrounds the inflator assembly 25) is located on the inner side.

As shown in FIG. 22B, the rotational phase of the roll-folding of the bag front portion 30f may be displaced by 90° with respect to that in the above illustrated embodiments. One of the upper portion 30u and the lower portion of the airbag 30 in the transitional form after the second folding using the fourth folding lines 77 and the fifth folding lines 78 is subjected to the first folding using the third folding line 75. At the third folding using the sixth folding line 79, the part on which the first folding has been performed may be folded to the outer side instead of rearward the rear, as folding action away from the occupant P.

As shown in FIG. 22C, in the above illustrated embodiments, as the second folding, the bag rear portion 30r, which has been accordion-folded, and the bag front portion 30f, which has been roll-folded, may be arranged side by side in the automobile widthwise direction and located in front of the inflator assembly 25.

In the above illustrated embodiments, the second folding may be performed with only one of the accordion-folding and the roll-folding.

At the third folding of the above illustrated embodiments, the lower portion of the airbag 30 in the transitional form may be folded back away from the occupant P (rearward or toward the outer side) like the upper portion 30u.

In the above illustrated embodiments, the lower portion of the airbag 30 is folded when the airbag 30 has been subjected to the second folding and turned into the transitional form of a vertically elongated shape. However, the lower portion may be folded before the airbag 30 is turned into the transitional form (before the second folding is performed). For example, the lower portion of the airbag 30 may be folded simultaneously with the first folding or in a period after the first folding and before the second folding.

In the second embodiment, the rear end of the fold-back portion 76, which is folded back in the first folding, may be at a position different from that in the first embodiment as long as it remains within the first inflation chamber 41.

In the second embodiment, the front end of the fold-back portion 76, which is folded back in the first folding, may be at a position different from that in the second embodiment as long as it is located above the vent hole 71, which is formed at the front end of the second inflation chamber 42. However, in order to ensure a sufficient volume of the fold-back portion 76, the front end of the fold-back portion 76 is preferably close to the vent hole 71.

<Regarding Inflation Portion 36>

The substantially entire airbag 30 may be formed of the inflation portion 36 as in the above illustrated embodiments, but may be partially formed by a non-inflation portion, which is not supplied with inflation gas or inflated.

It is generally known that, in regard to the impact resistance of the side portion of the upper body of an occupant P, the impact resistance of the shoulder region PS is higher than the impact resistance of the thorax PT. Thus, regarding an impact applied to the upper body of the occupant P from the side via the airbag 30, the impact applied to the thorax PT is preferably smaller than the impact applied to the shoulder region PS.

Figure 23A:
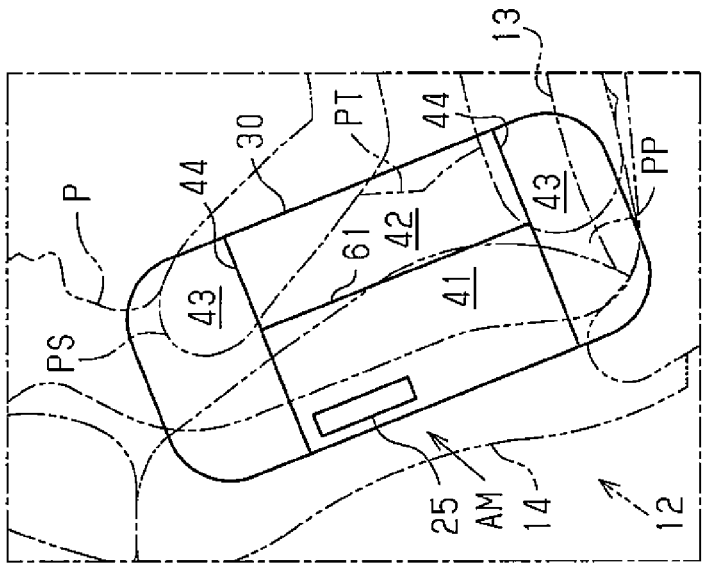
FIG. 23A is a partial side view illustrating an airbag according to a first modification, together with an automobile seat and an occupant.
Figure 23B:
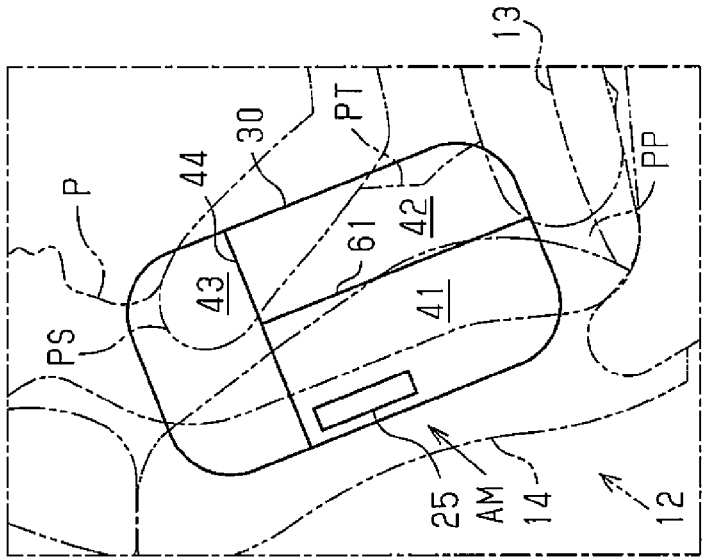
FIG. 23B is a partial side view illustrating an airbag according to a second modification, together with an automobile seat and an occupant.

Accordingly, as shown in FIGS. 23A and 23B, the lateral partition 44 may be located above the vertical partition 61, instead of below the vertical partition 61. That is, the third inflation chamber 43 may be located above the first inflation chamber 41 and the second inflation chamber 42, instead of below.

In this case, a lower part of the first inflation chamber 41 may be configured to be deployed and inflated beside the lumbar region PP as shown in FIG. 23A or may be configured to be deployed and inflated beside a part above the lumbar region PP as shown in FIG. 20B. In either case, at the first folding, the lower portion of the airbag 30 in the uninflated and deployed state is folded back away from the occupant P toward the outer side along a line that is inclined to be higher toward the front end in the front-rear direction.

In this configuration, even if the obstacle O exists in front of the airbag 30, the obstacle O is further reliably prevented from being thrust by the airbag 30, which is being deployed.

When an impact is applied to the automobile 10 from beside the automobile seat 12, the third inflation chamber 43 can be deployed and inflated beside the shoulder region PS, which has, in the upper body of the occupant P, a higher impact resistance than the thorax PT, with an internal pressure that is higher than that of the first inflation chamber 41, which is located below. Thus, the shoulder region PS is restrained by the third inflation chamber 43 with a pressure higher than that applied to the thorax PT. In this manner, the third inflation chamber 43 is deployed and inflated with a pressure that corresponds to the impact resistance of the shoulder region PS of the occupant P, so that the shoulder region PS is effectively protected from the impact by the third inflation chamber 43.

Figure 23C:
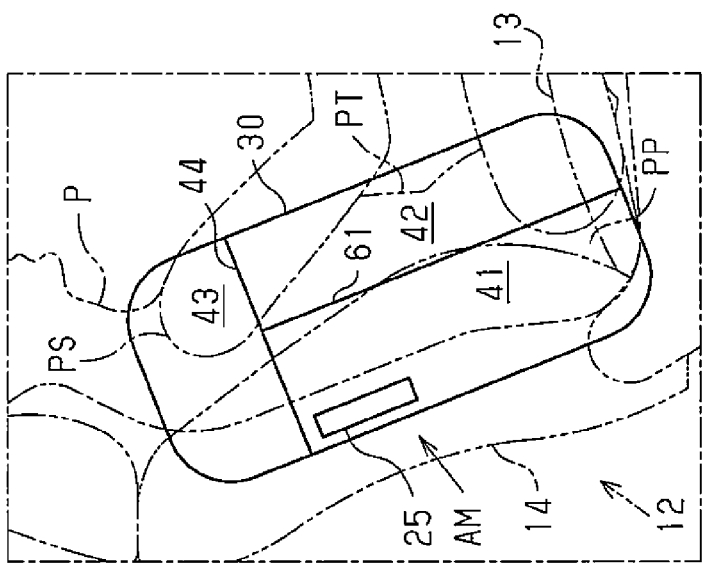
FIG. 23C is a partial side view illustrating an airbag according to a third modification, together with an automobile seat and an occupant.

As shown in FIG. 23C, a lateral partition 44 may be located above the vertical partition 61 in addition to the lateral partition 44 below the vertical partition 61. That is, a third inflation chamber 43 may be formed above the first inflation chamber 41 and the second inflation chamber 42, in addition to the third inflation chamber 43 below.

In this case, at the first folding, a folding line that is inclined to be lower toward the front end in the front-rear direction is set in the upper portion 30u of the airbag 30 in the uninflated and deployed state. Also, a folding line that is inclined to be higher toward the front end in the front-rear direction is set in the lower portion of the airbag 30 in the uninflated and deployed state. The upper portion 30u and the lower portion of the airbag 30 in the uninflated and deployed state are folded back away from the occupant P. In this configuration, even if the obstacle O exists in front of the airbag 30, the obstacle O is further reliably prevented from being thrust by the airbag 30, which is being deployed.

In this case, the first inflation chamber 41 may be deployed and inflated beside the rear half of the thorax PT, and the second inflation chamber 42 may be deployed and inflated beside the front half of the thorax PT. Also, the lower third inflation chamber 43 may be deployed and inflated beside the lumbar region PP, and the upper third inflation chamber 43 may be deployed and inflated beside the shoulder region PS.

FIGS. 23A to 23C schematically illustrate the arrangement of the vertical partition 61, the lateral partition 44, and other components. The details such as the opening 51 and the check valve 52 are omitted or simplified.

In the above illustrated embodiments, the third inflation chamber 43 may be provided under only the first inflation chamber 41. Also, in FIG. 23C, the third inflation chamber 43 may be provided under only the first inflation chamber 41.

Further, in FIGS. 23A and 23B, the third inflation chamber 43 may be provided over only the first inflation chamber 41. Also, in FIG. 23C, the upper third inflation chamber 43 may be provided over only the first inflation chamber 41.

In these cases, compared to the case in which the third inflation chamber 43 is provided over both the first inflation chamber 41 and the second inflation chamber 42, the third inflation chamber 43 is deployed and inflated in a narrower range in the front-rear direction. However, since the third inflation chamber 43 is deployed and inflated beside at least a part of the lumbar region PP or the shoulder region PS, with an internal pressure higher than that of the first inflation chamber 41, the lumbar region PP or the shoulder region PS is effectively restrained and protected from an impact.

<Regarding Vertical Partition 61>

The vertical partition 61 of the first embodiment may have the shape of the vertical partition 61 of the second embodiment. Also, the vertical partition 61 of the second embodiment may have the shape of the vertical partition 61 of the first embodiment.

In the vertical partition 61 of the above illustrated embodiments, it is possible to change the positional relationship in the front-rear direction of the edge joint portions connecting the fabric pieces 62, 63 to each other and the edge joint portions connecting the fabric pieces 62, 63 to the main body fabric portions 33, 34 of the airbag main body 31.

<Regarding Section in which Airbag Module AM is Stored>

Instead of the seat back 14 of the automobile seat 12, a part that corresponds to the storage portion 21 may be located in the body side portion 11 to accommodate the airbag module AM.

<Other Modifications>

In the above illustrated embodiments, an inner tube may be provided that regulates the flow of the inflation gas discharged by the inflator 26 such that a greater amount of the discharged gas is supplied to the third inflation chamber 43 than to the first inflation chamber 41. In other words, the inner tube regulates the flow of the inflation gas to supply the inflation gas preferentially to the third inflation chamber 43. The inner tube is shaped like a pipe and has a first end, which surrounds at least the gas outlet of the inflator 26, and a second end, which faces the third inflation chamber 43.

The present invention may be applied to a side airbag apparatus that does not include the lateral partition 44 or the third inflation chamber 43.

The present invention may be applied to a side airbag apparatus of an automobile in which a seat 12 faces in a direction other than the forward direction, for example, sideways. In this case, when an impact is applied to a side of the automobile seat 12 (in the front-rear direction of the automobile), the side airbag apparatus protects an occupant P from the impact.

Automobiles to which the side airbag apparatus according to the present invention is applied include various industrial vehicles in addition to private cars.

The above described side airbag apparatus may also be applied to an airbag apparatus installed in the seats in vehicles other than automobiles, including aircrafts and ships.

The invention claimed is:

1. A side airbag apparatus comprising:
   an inflator that discharges inflation gas in response to an impact applied to a vehicle seat from a side; and
   an airbag, wherein
   the airbag includes
      a vertical partition having a communication hole,
      an upstream-side inflation chamber that is supplied with the inflation gas from the inflator, and
      a downstream-side inflation chamber located adjacent to and in front of the upstream-side inflation chamber,
   the airbag is divided into at least the upstream-side inflation chamber and the downstream-side inflation chamber by the vertical partition,
   the inflation chamber is supplied to the downstream-side inflation chamber via the communication hole,
   the airbag is folded to be turned into a storage form,
   the airbag in the storage form is configured to be stored in a storage portion located in the vicinity of a side of an occupant seated in a vehicle seat,
   the airbag in the storage form is configured to be deployed and inflated forward beside the occupant by the inflation gas, and
   wherein the airbag in the storage form is formed by
      first folding in which at least one of an upper portion and a lower portion of the airbag in the uninflated and deployed state is folded back away from the occupant along a folding line that is inclined with respect to the front-rear direction,
      second folding performed after the first folding, wherein, in the second folding, the airbag is folded from the front toward the rear, and
      third folding in which, after the airbag has been turned into a transitional form in the second folding, one of the upper portion and the lower portion of the airbag that has been subjected to the first folding is folded back away from the occupant.

2. The side airbag apparatus according to claim 1, wherein a vent hole is formed at a front end of the downstream-side inflation chamber to discharge inflation gas in the downstream-side inflation chamber, and
   a part of the airbag that is folded back in the first folding includes the vent hole.

3. The side airbag apparatus according to claim 1, wherein a vent hole is formed at a front end of the downstream-side inflation chamber to discharge inflation gas in the downstream-side inflation chamber, and
   a part of the airbag in the storage form that is displaced from the vent hole is folded back in the first folding.

4. The side airbag apparatus according to claim 1, wherein the folding line is set to bridge the downstream-side inflation chamber and the upstream-side inflation chamber.

5. The side airbag apparatus according to claim 1, wherein the inflator is located at a rear end of the airbag in the uninflated and deployed state, and
   the second folding includes
   accordion-folding, which is performed on an airbag rear portion that is close to a part of the airbag that surrounds the inflator by alternating the folding direction, and
   roll-folding, which is performed by repeatedly folding in the same direction an airbag front portion that is located forward of the airbag rear portion.

* * * * *